US012730681B2

(12) United States Patent
Jiang et al.

(10) Patent No.: US 12,730,681 B2
(45) Date of Patent: Sep. 8, 2026

(54) EFFICIENT ASSIGNMENT OF RESOURCE-INTENSIVE COMPUTING JOBS

(71) Applicant: SAP SE, Walldorf (DE)

(72) Inventors: Wei Jiang, Shanghai (CN); Hao Weng, Shanghai (CN)

(73) Assignee: SAP SE, Walldorf (DE)

( * ) Notice: Subject to any disclaimer, the term of this patent is extended or adjusted under 35 U.S.C. 154(b) by 426 days.

(21) Appl. No.: 18/376,969

(22) Filed: Oct. 5, 2023

(65) Prior Publication Data

US 2025/0117260 A1 Apr. 10, 2025

(51) Int. Cl.
*G06F 9/50* (2006.01)

(52) U.S. Cl.
CPC ...... *G06F 9/505* (2013.01); *G06F 2209/5019* (2013.01); *G06F 2209/503* (2013.01)

(58) Field of Classification Search
CPC ......................... G06F 9/505; G06F 2209/5019
See application file for complete search history.

(56) References Cited

U.S. PATENT DOCUMENTS 11,153,374 B1 10/2021 Yu et al.
11,409,570 B2 8/2022 Yu et al.
2012/0137002 A1* 5/2012 Ferris .................... G06F 9/5072 709/226

OTHER PUBLICATIONS

"Li, Hui, Job Scheduling in Cloud Systems to Reduce Resource Fragmentation, U.S. Appl. No. 18/958,143, filed Nov. 25, 2024, 33 pgs", (Nov. 25, 2024), 33 pgs.
"Li, Hui, Improved Resource Utilization in Job Scheduler Systems, U.S. Appl. No. 18/505,204, filed Nov. 9, 2023, 33 pgs", 46 pgs.

* cited by examiner

*Primary Examiner* — Wissam Rashid
(74) *Attorney, Agent, or Firm* — SCHWEGMAN LUNDBERG & WOESSNER, P.A.

(57) ABSTRACT

Systems and methods described herein relate to the handling of resource-intensive computing jobs in a cloud-based job execution environment. An unexecuted computing job has a plurality of features. A resource intensity prediction is generated for the unexecuted computing job based on the features and on historical job data that classifies each of a plurality of executed computing jobs as either resource intensive or non-resource intensive. The resource intensity prediction indicates that the unexecuted computing job is predicted to be classified as resource intensive. A predicted resource intensity category of the unexecuted computing job is determined. Utilization data associated with one or more of a plurality of job execution destinations may be accessed. The unexecuted computing job may be assigned to a selected job execution destination from among the plurality of job execution destinations based on the predicted resource intensity category and the utilization data.

17 Claims, 9 Drawing Sheets

400

START 402

RECEIVE A REQUEST TO SCHEDULE A COMPUTING JOB 404

IDENTIFY FEATURES OF THE COMPUTING JOB 406

USE THE FEATURES AND HISTORICAL JOB DATA TO GENERATE A RESOURCE INTENSITY PREDICTION FOR THE COMPUTING JOB 408

DETERMINE A PREDICTED RESOURCE INTENSITY CATEGORY OF THE COMPUTING JOB 410

IDENTIFY AN ASSIGNMENT RULE CORRESPONDING TO THE PREDICTED RESOURCE INTENSITY CATEGORY OF THE COMPUTING JOB 412

ACCESS AND ANALYZE UTILIZATION DATA OF JOB EXECUTION DESTINATIONS 414

APPLY THE ASSIGNMENT RULE TO ASSIGN THE COMPUTING JOB TO A SELECTED JOB EXECUTION DESTINATION BASED ON THE PREDICTED RESOURCE INTENSITY CATEGORY AND THE UTILIZATION DATA 416

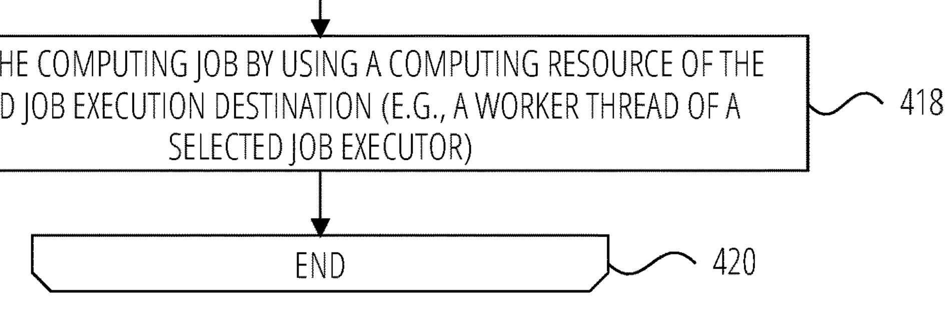

FIG. 4

EFFICIENT ASSIGNMENT OF RESOURCE-INTENSIVE COMPUTING JOBS

TECHNICAL FIELD

The subject matter disclosed herein generally relates to the scheduling of computing jobs in a cloud-based, distributed job execution framework. More specifically, but not exclusively, the subject matter relates to the identification of potentially resource-intensive computing jobs and the assignment of such computing jobs to job execution resources.

BACKGROUND

In a cloud-based job execution environment, job executors can be deployed to handle various computing workloads. A job executor may provide computing resources to execute computing jobs that are added to a queue by a job scheduler, while the job scheduler handles the routing of incoming computing jobs to appropriate queues.

While a cloud-based job execution environment can provide benefits, such as flexibility and scalability to handle dynamic workloads, certain computing jobs may give rise to technical challenges. In some cases, resource-intensive computing jobs are submitted to a job scheduler in a recurring fashion, resulting in "abusive" consumption of resources. Resource-intensive computing jobs may include, for example, computing jobs taking hours to execute, or computing jobs requiring more than 90% of the available processing or memory resources of a job executor. These "abusive" computing jobs may cause queues to become overloaded, delay other computing jobs, or even result in execution failures. Manual reassignment to other queues or job executors may alleviate these issues. However, such interventions can be time-consuming or error-prone, reducing the efficiency of job execution operations.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

FIG. 4 is a flowchart illustrating operations of a method suitable for identifying a computing job that is predicted to be resource intensive and assigning the computing job to a job execution destination, according to some examples.

DETAILED DESCRIPTION

Figure 1:
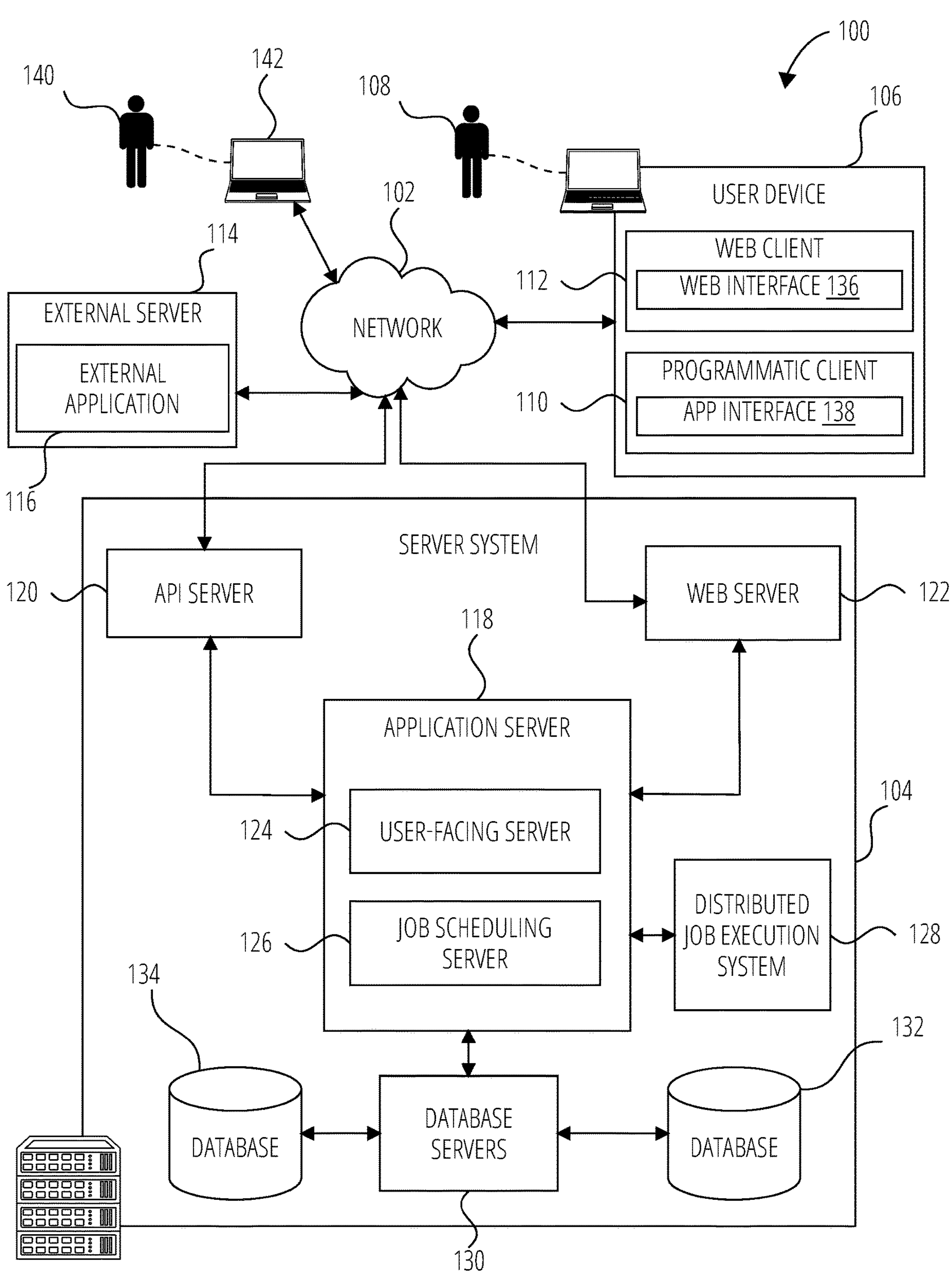
FIG. 1 is a diagrammatic representation of a network environment that includes a cloud-based job execution environment, according to some examples.

Examples described herein allow for the preemptive identification of resource-intensive or potentially resource-intensive computing jobs. In some examples, a computing job can be identified as resource intensive in advance (e.g., prior to execution by a job executor), allowing for improved handling of the computing job (e.g., more efficient scheduling, assignment, or processing).

The term "job executor," as used herein, refers to a deployed computing resource or collection of computing resources that performs the work of executing computing jobs, such as queued computing jobs assigned by a job scheduler in a cloud-based job execution environment. A job executor may be implemented as a server, group of servers, one or more virtual machines, one or more containers, or the like, with configurable processing cores, memory, and other hardware resources for running computing jobs. In some cases, a job executor implements multiple worker threads allowing it to execute computing jobs concurrently. Examples of computing jobs (also referred to herein simply as "jobs") include batch data processing jobs, data backup jobs, data extraction jobs, indexing jobs, simulation jobs, report generation jobs, data analytics jobs, web application jobs, image processing jobs, encoding jobs (e.g., video encoding), or machine learning jobs (e.g., machine learning model training). The disclosure is not restricted to a particular type of computing job.

In some cases, a job executor is assigned work by an automated job scheduler or other automated scheduling infrastructure. The job executor may retrieve pending computing jobs from a queue managed by the job scheduler, run the computing jobs using its available resources, and then return results after completion. Multiple job executors, at least some of which may have different hardware capacities, may be deployed on shared cloud infrastructure.

The term "resource intensive," as used herein in relation to a computing job, refers to a computing job that consumes or requires significant resources, or occupies resources for a significant period of time, in the context of a given job execution environment. A computing job can be classified as resource intensive according to one or more resource intensity criteria. It will be appreciated that resource intensity criteria may vary, depending, for example, on the technical requirements, resources, or infrastructure of a particular environment, or the nature of the computing jobs executed within the environment. Resource intensity criteria may also be user-selectable or user-adjustable.

One example of a resource-intensive computing job may be a long-running job. For example, a computing job that takes more than 1 hour, 2 hours, 3 hours, or 10 hours (depending on the implementation) to be executed may be classified as a long-running job. Another example of a resource-intensive computing job may be a computing job with high memory resource utilization (e.g., consuming more than 90% of available memory resources of a given job executor during a particular time period) or more than a predefined amount of memory (e.g., more than 64 gigabytes (GB) of Random Access Memory (RAM) during a particular time period). Similarly, a computing job with relatively high processing resource (e.g., Central Processing Unit (CPU)) requirements may be classified as a resource-intensive computing job based on a predetermined threshold.

As alluded to above, resource-intensive computing jobs, such as those that are time-intensive or CPU-intensive, or those that have large memory footprints, can tend to be "abusive" in the sense that they consume job executor resources to the detriment of other computing jobs, such as where job executors are shared among different teams, projects, or customers. Where a job scheduler distributes queued jobs to job executors in a random or round-robin fashion, certain job executors can then become overloaded by such resource-intensive computing jobs, resulting in bottlenecks in certain queues, even where other resources may be underutilized. In some cases, resource-intensive computing jobs can completely exceed the capacities of poorly matched job executors, resulting in failures and lost time.

Examples described herein address or alleviate technical limitations in job scheduling or job assignment systems through preemptive identification of potentially resource-intensive computing jobs. In some examples, a job scheduler receives an unexecuted computing job. For example, a user or automated submission component submits a request to the job scheduler for a computing job to be executed. A method according to the present disclosure may include generating, based on historical job data and one or more features of the unexecuted computing job, a resource intensity prediction.

The historical job data may include, or be generated from, past utilization data. The historical job data may classify each of a plurality of executed computing jobs as either resource intensive or non-resource intensive. The executed computing jobs may share at least some of the features of the unexecuted computing job.

The features of the unexecuted computing job may be features that are likely to impact whether a computing job will be classified as resource intensive or non-resource intensive. For example, the job scheduler may analyze features such as a job submitter (e.g., a company or user associated with the computing job, as identified by a company identifier or user identifier), a job type, a job submission time, or a job start time (e.g., scheduled or requested start time).

The resource intensity prediction may indicate that the unexecuted computing job is predicted to be classified as resource intensive or to be classified as non-resource intensive. In some examples, a job scheduler generates a resource intensity prediction indicating that the unexecuted computing job is predicted to be classified as resource intensive. In other words, the job scheduler may predict, prior to execution and based on both features of the unexecuted computing job and historical job data, that the unexecuted computing job will, when executed, be classified as resource intensive. The job scheduler may generate the resource intensity prediction before or after receiving a job request relating to the unexecuted computing job.

If a "positive" resource intensity prediction (indicating the unexecuted computing job is predicted to be resource intensive) is generated or retrieved, the job scheduler or a job executor may determine a predicted resource intensity category of the unexecuted computing job. The predicted resource intensity category may be selected from a plurality of resource intensity categories, such as a long-running job category or a high resource utilization category. Different types of high resource utilization categories may be detected (e.g., a high memory resource utilization category and a high processing resource utilization category). As mentioned above, such categories may be defined based on resource intensity criteria, which can depend on the implementation.

In some examples, the predicted resource intensity category is determined based on the historical job data. For example, the job scheduler or the job executor may determine a probability value for each resource intensity category from the historical job data and select the resource intensity category with a highest probability value as the predicted resource intensity category for the unexecuted computing job. The probability value may be determined from a subset of the historical job data that includes the executed computing jobs with the same features as that of the unexecuted computing job. Machine learning techniques may be used to predict resource intensity categories. For example, a machine learning classifier may predict the most likely resource intensity category based on the features of the unexecuted computing job.

The method may include accessing utilization data associated with a plurality of job execution destinations (e.g., a plurality of cloud-based execution resources). For example, the job execution destinations may be different job executors and the method may thus include checking respective utilization (e.g., loads) of the different job executors. The unexecuted computing job may be assigned to a selected one of the job execution destinations based on the predicted resource intensity category and the utilization data.

While a job executor is an example of a job execution destination, in some cases, the job scheduler may assign or lock an unexecuted computing job to another job execution destination, such as a specific queue that is in turn linked to a plurality of job executors with certain available resources. For example, the job scheduler may reassign the unexecuted computing job from an initially designated queue to a different queue that is linked to job executors with greater processing or memory resources.

In some examples, the job scheduler or a job executor identifies an assignment rule corresponding to the predicted resource intensity category. At least some of the resource intensity categories have different assignment rules. For example, a first assignment rule may be applied if the unexecuted computing job is predicted to be a long-running job, while a second assignment rule is applied if the unexecuted computing job is predicted to be a high memory resource job. The relevant assignment rule corresponding to the predicted resource intensity category is applied to select the selected job execution destination from among the plurality of job execution destinations.

In examples where an unexecuted computing job is predicted to be non-resource intensive, the selected assignment rule may differ from both the first assignment rule and the second assignment rule. For example, the unexecuted computing job may simply be assigned to a first available (or next available) job execution destination, based on a default assignment rule that does not involve load checking or load prediction.

As mentioned, a computing job may be classified as resource intensive if the computing job meets one or more resource intensity criteria. The one or more resource intensity criteria such as: the duration of the computing job exceeds a time threshold, a load associated with the computing job exceeds a maximum load, memory resources consumed by the computing job exceed a memory resource threshold, or processing resources consumed by the computing job exceed a processing resource threshold. A system according to the present disclosure may thus predict, prior to execution, whether a computing job will (or is likely to) meet one or more resource intensity criteria.

The method may include performing time series-based predictions to arrive at the resource intensity prediction. The resource intensity prediction may indicate that the unexecuted computing job is predicted to be classified as resource intensive in a discrete future time period. The historical job data may be segmented into discrete time periods preceding the future time period (e.g., a time sequence) in order to generate one or more time series-based predictions.

For each time period in the historical job data, the job scheduler may generate, based on the executed computing jobs that occurred during the time period, a resource intensity possibility value. The resource intensity possibility value may be a first resource intensity possibility value that indicates a likelihood that a given computing job with the features of the unexecuted computing job would have been classified as resource intensive in that time period (e.g., a probability value or other value indicative of this "possibility"). The job scheduler may then use the resource intensity possibility values for all the time periods to generate the resource intensity prediction for the future time period.

In some examples, in addition to the first resource intensity possibility value that indicates the likelihood of a computing job being resource intensive, a second resource intensity possibility value may be generated to obtain a likelihood (or an indication of likelihood) that a computing job is non-resource intensive. For each time period in the historical job data, the job scheduler may generate, based on the executed computing jobs that occurred during the time period, a second resource intensity possibility value.

In some examples, an aggregated value that is based on the first resource intensity possibility values is compared to an aggregated value that is based on the second resource intensity possibility values to determine the resource intensity prediction for the future time period. An exponential smoothing algorithm, such as single exponential smoothing, may be applied to obtain each aggregated value, as is described in greater detail below. In some examples, the aggregated values are generated in advance, prior to receiving a new job, in which case the new job may be swiftly classified against the aggregated values once its features are identified to determine whether the new job is predicted to be resource intensive.

Examples described herein may address or alleviate one or more technical problems associated with computing job scheduling or execution. As mentioned, resource-intensive or "abusive" computing jobs, such as long-running batch processes or high memory or processing resource tasks that are submitted at the same time each day, can overload computing resources, causing queued jobs to bottleneck or even fail. This can waste computing capacity and may require manual oversight or intervention to rebalance loads. The technical problem of a lack of visibility, on the part of a job scheduler, into predicted job resource usage or intensity, may be addressed through preemptive predictions and job assignments as described herein.

In some examples, machine learning techniques may be applied to classify usage patterns from historical job data and predict whether incoming computing jobs will be resource intensive. Technical obstacles in identifying or isolating problematic job types may also be addressed or alleviated. A traditional job scheduler may be unable to classify computing jobs into usage categories or predict intensity ahead of time. The data-driven projection techniques described herein may, based on time-segmented historical job data, result in improved resource allocation and reduced bottlenecks, as well as a reduction in the need for manual intervention.

Features described herein may work together to provide a technical solution for intelligently isolating and routing potentially problematic computing jobs. Additional technical solutions described in some examples include granular segmentation of job types and automated generation of resource intensity metrics, used downstream to optimize computing job throughput and reduce failures, or reduce or eliminate the need for manual interventions in job scheduling.

When the effects in this disclosure are considered in aggregate, one or more of the methodologies described herein may obviate a need for certain efforts or resources that otherwise would be involved in job scheduling, resource assignment, manual oversight, or failure remediation. Computing resources utilized by systems, databases, or networks may be more efficiently utilized. As a result of the preemptive identification and assignment of resource-intensive computing jobs in a data-driven manner, one or more of the following may be reduced: manual oversight by operations teams to monitor executor loads and manually reassign abusive jobs when overloading occurs, job failures and retries due to inadequate resources or overloaded job executors, queue backlogs from bottlenecks caused by "abusive" computing jobs overloading job executors, inefficient use of computing resources as a result of poor job executor selection, or latency impacts on dependent computing jobs when other computing jobs monopolize job executors. Examples of such computing resources that may be more efficiently utilized may include CPU resources (e.g., processor cycles), network traffic, memory usage, graphics processing unit (GPU) resources, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 112 (e.g., a browser) or a programmatic client 110 (e.g., an "app") may be hosted and executed on the user device 106.

An Application Program Interface (API) server 120 and a web server 122 provide respective programmatic and web interfaces to components of the server system 104. A specific application server 118 hosts a user-facing server 124 and a job scheduling server 126, which includes components, modules, or applications. The job scheduling server 126 is communicatively coupled with a distributed job execution system 128 forming part of the server system 104.

The user device 106 can communicate with the application server 118. For example, the user device 106 can communicate with the application server 118 via the web interface supported by the web server 122 or via the programmatic interface provided by the API server 120. It will be appreciated that, although only a single user device 106 is shown in FIG. 1, a plurality of user devices may be communicatively coupled to the server system 104 in some examples. For example, the job scheduling server 126 may receive requests originating from a plurality of different users (e.g., customers) and schedule computing jobs for execution by the distributed job execution system 128. Furthermore, an administrator 140 may use an administrator device 142 (which may be similar to the user device 106) to communicate with the application server 118, as described further below.

The application server 118 is communicatively coupled to database servers 130, facilitating access to one or more information storage repository, such as a database 132 and a database 134. In some examples, the database 132 or the database 134 includes storage devices that store information to be processed by the job scheduling server 126 or the distributed job execution system 128 (e.g., data to be processed as part of computing jobs submitted by the user 108 via the user device 106).

For example, the database 132 may be a scheduling database that stores scheduling data used by the job scheduling server 126, such as information about job executors (e.g., capabilities and load), job queues, policies and assignment rules, historical job data for predicting resource intensity or categories, rules for generating such predictions, and metadata. The database 134 may be a tenant database that is customer-specific. A tenant database may include tenant-specific data, such as credentials, settings, workspace storage allocation, job data for computing jobs, billing data, and so forth. For example, the server system 104 may separate the tenant-specific data into a separate database or other data structure for each customer (e.g., the user 108). Such a separation may allow the job scheduling server 126 to coordinate execution across tenants while also keeping tenant data private and isolated.

The application server 118 accesses application data (e.g., application data stored by the database servers 130) to provide one or more applications or software tools to the user device 106 via a web interface 136 or an app interface 138. The tools may also be accessed or used by automated components, as described further with reference to FIG. 2.

The application server 118, using the job scheduling server 126, may provide one or more tools or functions for automated job scheduling and job exaction. The user-facing server 124 may assist the user 108 to create, manage, maintain, adjust, or submit computing jobs via the user device 106. The user-facing server 124 may provide one or more dashboards via a graphical user interface on the user device 106. For example, a dashboard that summarizes a current status of each of a plurality of computing jobs may be provided by the user-facing server 124.

The job scheduling server 126 receives computing jobs (e.g., from the user 108, from other users, from automated job submission components, or combinations thereof) and schedules the computing jobs for execution by the distributed job execution system 128. The job scheduling server 126 communicates with the distributed job execution system 128 to schedule, assign, and report on such computing jobs. The distributed job execution system 128 may include multiple job executors, as well as one or more job queues, as is described in more detail below.

In some examples, the server system 104 is part of a cloud-based platform that allows the user 108 to utilize the distributed job execution system 128 within a cloud-based job execution environment. One or more of the application server 118, the database servers 130, the API server 120, the web server 122, the user-facing server 124, the job scheduling server 126, or the distributed job execution system 128, or parts thereof, may each be implemented in a computer system, in whole or in part, as described below with respect to FIG. 9.

In some examples, external applications, such as an external application 116 executing on an external server 114, can communicate with the application server 118 via the programmatic interface provided by the API server 120. For example, a third-party application may support one or more features or functions on a website or platform hosted by a third party, or may perform certain methodologies and provide input or output information to the application server 118 for further processing or publication. The external application 116 may, for instance, submit computing jobs to the application server 118 for scheduling and subsequent running by the distributed job execution system 128.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
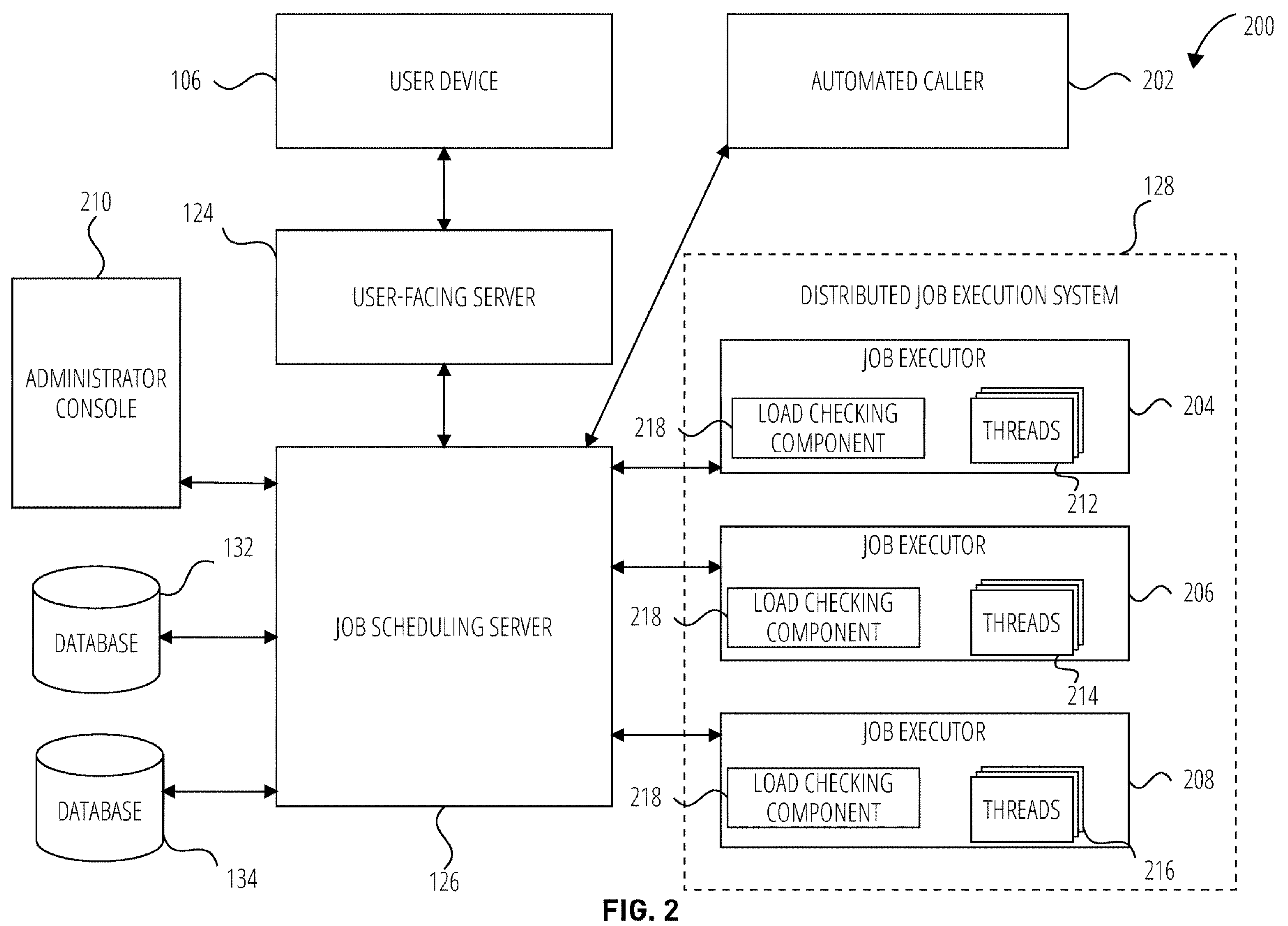
FIG. 2 is a block diagram illustrating interactions with and between certain components in a cloud-based job execution environment, according to some examples.
Figure 3:
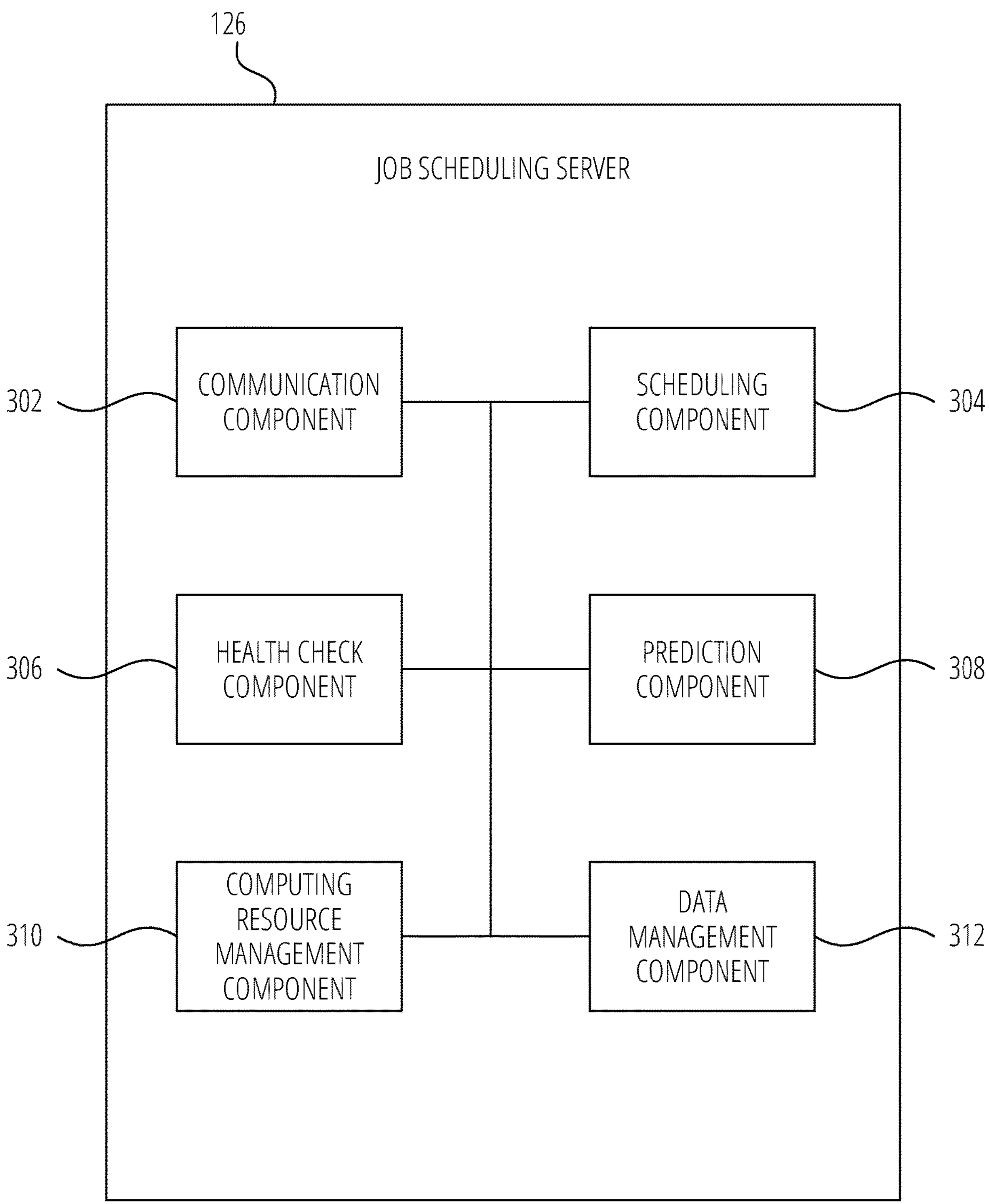
FIG. 3 is a block diagram of certain components of a job scheduling server, according to some examples.

FIG. 2 illustrates interactions with and between certain components in a cloud-based job execution environment 200, according to some examples, and FIG. 3 illustrates components of the job scheduling server 126 of FIG. 1, according to some examples. At least some of the components shown in FIG. 1, FIG. 2, or FIG. 3 may be configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Referring now to the cloud-based job execution environment 200 shown in FIG. 2, the cloud-based job execution environment 200 is shown to include the user-facing server 124, the job scheduling server 126, the distributed job execution system 128, and the databases 132 and 134 of FIG. 1. The user device 106 (also of FIG. 1) and an automated caller 202 can submit computing jobs to the job scheduling server 126, as described above, with the user device 106 communicating with the job scheduling server 126 via the user-facing server 124 and the automated caller 202 communicating directly with the job scheduling server 126.

The cloud-based job execution environment 200 further includes an administrator console 210 that allows an administrator (e.g., the administrator 140 using the administrator device 142) to communicate with the job scheduling server 126. A REST (representational state transfer) API architecture may be employed to allow the user-facing server 124, the automated caller 202, the distributed job execution system 128, and the administrator console 210 to communicate with the job scheduling server 126.

As mentioned, the user-facing server 124 provides an interface for users to submit computing jobs and access results. This may include web-based or programmatic interfaces, such as the web interface 136 or the app interface 138 of FIG. 1. The automated caller 202 represents an automated client that programmatically submits jobs for execution. The automated caller 202 calls job scheduling server 126 to submit jobs or receive results without requiring manual user intervention (e.g., a "backend API caller" provided by a microservice of a business).

The administrator console 210 allows administrative oversight or control in the context of the cloud-based job execution environment 200. Operators (e.g., the administrator 140) can use the administrator console 210 to monitor system status, view job logs, adjust configurations and policies, and manually reassign jobs between queues if needed.

Referring now more specifically to the distributed job execution system 128, the distributed job execution system 128 includes a plurality of job executors 204, 206, and 208. Each of the job executors 204-208 may implement multiple worker threads 212, 214, and 216, as shown in FIG. 2. Each of the job executors 204-208 may be provided by one or more servers, virtual machines, containers, pods, worker nodes, or the like (depending on the implementation) that provides computational resources to run computing jobs dispatched or assigned to it by the job scheduling server 126. Three job executors 204-208 are shown in FIG. 2 merely for illustrative purposes, and it will be appreciated that a larger number of job executors may be deployed in the cloud-based job execution environment 200. In some examples, job executors may be dynamically added to, or removed from, the distributed job execution system 128 to scale the distributed job execution system 128 up or down to match demand or predicted demand.

In some examples, each of the job executors 204-208 runs on server hardware, which could be either a physical machine or a virtual machine (e.g., a virtual machine instance in a cloud-based deployment). The hardware may include components such as CPUs, RAM, storage, and network interfaces. A software stack of a job executor may include an operating system, execution runtimes such as Java Virtual Machines (JVMs) or Python, the executor software itself to handle computing jobs, as well as libraries or dependencies. The worker threads 212-216 may be concurrent processing units within executor software. On multicore servers, a job executor can leverage threads to work on multiple jobs simultaneously, with the threads executing the computing jobs assigned by the job scheduling server 126.

FIG. 2 further illustrates that each of the job executors 204-208 has a load checking component 218. The load checking component 218 monitors the resource utilization of its associated job executor 204, 206, or 208. For example, the load checking component 218 measures metrics such as CPU, memory, and I/O usage to determine various aspects of a current load on a job executor. This load data may be referred to as utilization data and may be transmitted to the job scheduling server 126 for use in scheduling, predictions, or assignments, as described further below. In some examples, the load checking component 218 itself is used to generate load predictions for future time periods.

The job scheduling server 126 is responsible for accepting job requests, scheduling them, and assigning them to appropriate job executors in the distributed job execution system 128. FIG. 3 illustrates certain components of the job scheduling server 126, according to some examples. In FIG. 3, the job scheduling server 126 is shown to include a communication component 302, a scheduling component 304, a health check component 306, a prediction component 308, a computing resource management component 310, and a data management component 312.

The communication component 302 receives data sent to the job scheduling server 126 and transmits data from the job scheduling server 126. For example, the communication component 302 may receive computing jobs submitted by the user device 106 (via the user-facing server 124) and transmit results back to the user device 106 (via the user-facing server 124). The communication component 302 may handle network communication and APIs for the job scheduling server 126 to interact with other components, including the distributed job execution system 128.

The scheduling component 304 schedules and manages pending computing jobs, such as queues of pending jobs, and determines assignment of unexecuted computing jobs to available job executors based on assignment rules, policies and predicted resource requirements. In some examples, a queue stores and manages jobs awaiting processing. A queue may be an in-memory queue within the job scheduling server 126 or a distributed queue, such as a distributed queue running on a cluster. Computing jobs are temporarily stored in a queue prior to execution.

The health check component 306 monitors the overall health and status of the job executors 204-208 and infrastructure to ensure availability and reliability. The health check component 306 may trigger alerts, restarts, or failovers if issues are detected.

The prediction component 308 analyzes historical job data, together with features of unexecuted computing jobs, to generate forecasts or estimates of resource intensity for new or expected jobs. This enables preemptive identification of potentially "abusive" jobs before assignment by the job scheduling server 126. The prediction component 308 may also generate predictions with respect to the resource intensity category of an unexecuted computing job.

The computing resource management component 310 tracks availability, load, capacities, and statuses of the registered job executors. The computing resource management component 310 may be used to provide insight into current loads and help identify executors for new jobs.

The data management component 312 handles storage and retrieval of data used by the job scheduling server 126 or the distributed job execution system 128, such as historical job data, system logs, feature data of computing jobs, policies, assignment rules, or configurations. The historical job data may include utilization data associated with previous runs (e.g., obtained from logs) and the utilization data may be used to classify previously executed computing jobs as resource intensive or non-resource intensive. The data management component 312 may manage the databases and storage systems used by the job scheduling server 126 and by other components in the cloud-based job execution environment 200 (e.g., the database 132 and the database 134).

During operation, the job scheduling server 126 may use the health check component 306 or the computing resource management component 310 to monitor the job queue (or queues) and the current status of all registered job executors, such as the job executor 204, the job executor 206, or the job executor 208. As is described further below, in addition to conventional logic, such as job priority logic, the job scheduling server 126 uses the prediction component 308 to make predictions as to whether unexecuted computing jobs will be resource intensive, and handles assignment of those unexecuted computing jobs based on the results of the predictions using the scheduling component 304.

Once a job executor, such as the job executor 204 (which is used as an example below) is selected for a queued job, the job scheduling server 126 may lock the job executor 204 to the job and then dispatch the job to that job executor 204. Upon receiving a new job, the job executor 204 may assign it to one of its available worker threads 212 for processing.

The worker thread 212 executes the job to completion, then reports the status back to both the job executor 204 and the job scheduling server 126. The cloud-based job execution environment 200 may implement a continuous feedback loop between the distributed job execution system 128 and the job scheduling server 126. For example, the job executors 204-208 may regularly send back status updates, including metrics for utilization data, such as busy versus free threads, overall health, loads, and other data.

Predictive techniques may be used to identify an unexecuted computing job that could potentially be resource intensive, so that the unexecuted computing job can be isolated or a suitable assignment rule can be applied to the unexecuted computing job prior to execution. The predictions may be performed by the prediction component 308 of the job scheduling server 126. For example, a job executor in the distributed job execution system 128 may call the job scheduling server 126 and request a resource intensity prediction before the job executor commences with job execution. For example, a job executor may call the job scheduling server 126 to obtain the resource intensity prediction in order for the job executor to decide whether it should pick up the unexecuted computing job or request that it be reassigned. Alternatively, the job scheduling server 126 may generate the resource intensity prediction before assigning the unexecuted computing job to a specific queue or job executor. In some examples, a resource intensity prediction may be generated in advance (e.g., with respect to a future job or expected future job that has not yet arrived at the job scheduling server 126). In other examples, a resource intensity prediction may be generated substantially in real-time (e.g., in response to receiving a job request at the job scheduling server 126).

As mentioned above, certain features or attributes of a computing job may have a significant impact on whether the computing job will be resource intensive. For example, certain job submitters (e.g., as identified by company or user identifiers) may more regularly submit resource intensive computing jobs than other job submitters. As another example, certain job types (e.g., machine learning training tasks) may frequently be resource intensive compared to other job types. As a further example, jobs that start at a certain time (e.g., midnight) or in certain time windows may be classified as resource intensive more frequently than jobs executed during other periods. Certain companies may, for instance, choose to run background jobs such as employee data imports or large data synchronizations at night, while employees are not at work, thus resulting in possible strain on the distributed job execution system 128. Accordingly, certain features may contribute significantly to whether a computing job will be resource intensive, and an analysis of such features may be useful in predicting whether a new, unexecuted computing job is likely to be resource intensive.

It will be appreciated that the abovementioned features are provided primarily as examples, and that other features may be used without departing from the scope of this disclosure, given that a specific set of features selected can depend on various factors, such as the type of execution system, the types of jobs handled by the system, the number of types of users making use of the system, and so forth. In other words, while job submitter, job type, and job start time were selected as key factors of computing jobs in examples described herein, one or more other features or attributes may be utilized in other examples. Examples of other features or attributes may include job name, job scheduling type, number of job parameters, and type of job parameters.

Details of executed computing jobs in historical job data (e.g., historical job data stored in the database 132) may be analyzed to generate such predictions. Executed computing jobs with one or more of the selected set of features (e.g., job submitter, job type, and job start time) may be analyzed to determine which of the executed computing jobs were resource intensive, and, for example, at what times those computing jobs were executed.

For example, the job scheduling server 126 may analyze data from job execution logs that provide, for each executed computing job, one or more of the following data points: job identifier, job submitter, job type, job start time, job duration, memory usage, or CPU usage. The data management component 312 may process such "raw" data to classify each executed computing job as resource intensive or non-resource intensive. As mentioned above, one or more resource intensity criteria can be used for this classification.

For example, if the job duration exceeded a time threshold, the executed computing job is classified as resource intensive. As another example, if the executed computing job consumed more than 90% of the CPU resources of the job executor it was assigned during a particular time period, it is classified by the data management component 312 as resource intensive. The data management component 312 may further classify each executed computing job according to its resource intensity category. For example, an executed computing job may be classified to indicate whether the executed computing job falls in a long-running job category, a high resource utilization category, or a high memory resource utilization category.

In order to generate predictions relating to resource usage intensity or resource intensity category for a future time period, the prediction component 308 of the job scheduling server 126 may segment the historical job data into time periods, or time slices. In other words, the prediction component 308 may divide the data into different time periods, such as sequential time periods of 5 minutes each across an overall period of 7 days, or sequential time periods of 30 minutes each across an overall period of a 30-day period. However, these time periods are merely examples. As is described further below, the prediction component 308 may use the segmented historical job data to generate resource intensity possibility values for relevant computing jobs that occurred during the past periods, and then use those resource intensity possibility values to generate predictions for an incoming (or possibly incoming) computing job with respect to a future time period.

FIG. 4 is a flowchart illustrating operations of a method 400 suitable for identifying a computing job that is predicted to be resource intensive and assigning the computing job to a job execution destination, according to some examples. Aspects of the method 400 may be performed by components, devices, systems, networks, or databases shown in FIGS. 1-3. Accordingly, elements depicted in FIGS. 1-3 are referred to below by way of example and not limitation.

The method 400 commences at opening loop element 402 and proceeds to operation 404, where the job scheduling server 126 receives a request to schedule a new computing job. For example, the job scheduling server 126 may receive the request from the user device 106 (via the user-facing server 124) or from the automated caller 202. The job scheduling server 126 then identifies a set of features of the unexecuted computing job at operation 406. As mentioned above, for example, the job scheduling server 126 may identify the job submitter, the job type, and the job start time (e.g., requested start time) of the specific unexecuted computing job.

At operation 408, the job scheduling server 126 uses the identified features together with historical job data to generate a resource intensity prediction for the unexecuted computing job. In some examples, a resource intensity prediction is generated in advance such that, when a new (unexecuted) job is received, the resource intensity prediction for that job is ready to be used. For example, the job scheduling server 126 may calculate or update predictions based on executed jobs from a previous day (or other period) and finalize such calculations or predictions at, or shortly after, the end of the previous day. When the new (unexecuted) job is received, the identified features of the job may then be used to retrieve the corresponding resource intensity prediction.

In some cases, a prediction process is performed partially in advance and partially in real-time. For example, historical job data may be processed or preprocessed in advance (e.g., as described below with reference to FIG. 5), with a final resource intensity prediction for a specific job being generated, based on the processed or preprocessed historical job data, once the job has been received at the job scheduling server 126. In other cases, the entire prediction process for a specific job may be performed substantially in real-time (e.g., only in response to receiving the job).

At a high level, the prediction process may involve slicing or segmenting historical job data into different time periods, calculating possibility values for each time period based on the historical job data in each time period, and predicting whether the new, unexecuted computing job will be resource intensive in a future time period. More detailed examples are discussed with reference to FIG. 5 below.

As mentioned elsewhere, the resource intensity prediction may be generated by the job scheduling server 126. For example, a job executor may receive the unexecuted computing job based on the job executor being the next available or "next in line" according to a conventional scheduling rule, but then request the resource intensity prediction from the job scheduling server 126 prior to deciding whether to execute or reject the job.

In the method 400 of FIG. 4, the resource intensity prediction indicates that the unexecuted computing job is likely to be resource intensive (e.g., more likely to be resource intensive than it is likely to be non-resource intensive). Based on the "positive" resource intensity prediction, the job scheduling server 126 determines a predicted resource intensity category of the unexecuted computing job at operation 410.

For example, based on the historical job data and the features of the unexecuted computing job, the prediction component 308 may generate a set of probability values, each of which indicates a probability that the unexecuted computing job will be classified in a respective resource intensity category, once it has been executed and usage statistics can be checked to classify the computing job. The resource intensity category with the highest probability value may then be selected as the predicted resource intensity category. The predicted resource intensity category may, for example, be a long-running job category or a high resource utilization category. In some examples, the predicted resource intensity category may be determined at a job executor.

The method 400 proceeds to operation 412, where the job scheduling server 126 identifies an assignment rule that corresponds to the predicted resource intensity category. For example, the scheduling component 304 may identify a specific rule to be used to assign a long-running job to a job executor or to a queue serving certain job executors. The job scheduling server 126 further accesses and analyzes utilization data of possible job execution destinations (e.g., available job executors) at operation 414. The assignment rule is then applied at operation 416 to assign the unexecuted computing job to a selected job execution destination based on the utilization data. In some examples, the assignment rule may be identified or applied at a job executor instead of being identified or applied at the job scheduling server 126. More detailed examples are discussed with reference to FIG. 6 below.

At operation 418, the relevant job executor then causes execution of the computing job. For example, the job scheduling server 126 may cause a specific job executor with qualifying load characteristics (e.g., the job executor 206 of FIG. 2) to pick the unexecuted computing job up according to an assignment rule that corresponds to the predicted resource intensity category of the unexecuted computing job, after which one of the worker threads 214 of the job executor 206 executes the computing job.

It is noted that, once the computing job has been completed, results can be returned to the job submitter (e.g., to the user device 106 via the user-facing server 124) and data relating to the computing job (e.g., job features, duration, CPU usage, and memory usage) may be fed back to the job scheduling server 126 to update the historical job data in the relevant database, such as the database 132. Such data may then be used for future predictions.

Accordingly, in some examples, if a probability or other indicative score shows that an incoming, pending, or expected computing job is likely to be "abusive" in the context of the cloud-based job execution environment 200, the computing job can be flagged and automatically handled according to the appropriate rules, thereby ensuring greater job execution efficiency without requiring manual intervention. The method 400 concludes at closing loop element 420.

Figure 5:
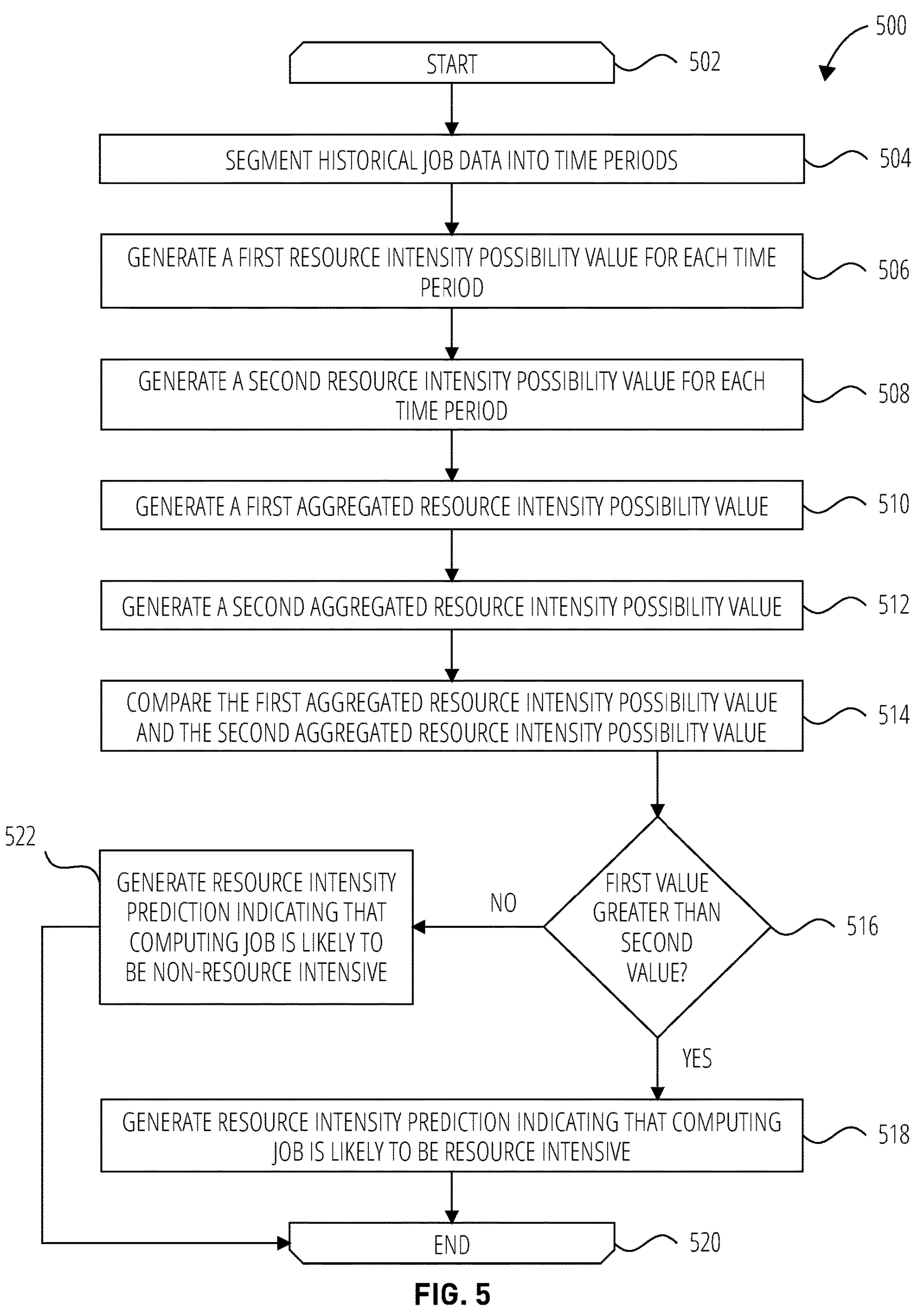
FIG. 5 is a flowchart illustrating operations of a method suitable for generating a resource intensity prediction for a computing job, according to some examples.

FIG. 5 is a flowchart illustrating operations of a method 500 suitable for generating a resource intensity prediction for a computing job, according to some examples. Aspects of the method 500 may be performed by components, devices, systems, networks, or databases shown in FIGS. 1-3. Accordingly, elements depicted in FIGS. 1-3 are referred to below by way of example and not limitation.

The method 500 commences at opening loop element 502 and proceeds to operation 504, where the prediction component 308 segments historical job data into time periods. For example, the prediction component 308 may use the historical job data from the previous 30 days of operation of the distributed job execution system 128 and arrange the historical job data into discrete time periods (e.g., discrete 1-minute, 5-minute, or 30-minute time periods), thereby creating a sequence of time periods. Jobs are then grouped into the time periods during which they occurred. For example, jobs may be grouped into such time periods based on their starting times.

Different techniques may be used to select time periods or segment or assign the historical job data into time periods. In some examples, a total period is divided into sequential and separate time periods, such as a 30-day period being split into 30-minute time periods to create a sequence of 1,440 time periods. In such cases, jobs that occurred (e.g., started in or ended in) a specific time period in the sequence are assigned to that time period. In other examples, historical job data from different days are aggregated into "time of day" based time segments. For example, a notional day may be divided into 30-minute time slots (e.g., 00:00-00:30, 00:30-01:00, 01:00-01:30, etc.), with all historical job data from the past 30 days being grouped by time slot. In such cases, for example, all jobs that occurred (e.g., started or ended in), for example, in the 09:00-09:30 time period, are grouped together, irrespective of the day on which each job occurred, and there are 48 time periods in total.

For each time period, the prediction component 308 generates a first resource intensity possibility value and a second resource intensity possibility value (operation 506 and operation 508, respectively). In the example of FIG. 5, the first resource intensity possibility value indicates the likelihood of a computing job being classified as resource intensive within that time period, given the specific set of features in question. This possibility value can be represented as $$P^t_{a|j,c,s},$$

where t is the time period, a is "abusive" (referring to the job being resource intensive), j is the job type, c is the company identifier (as an example of a job submitter identity), and s is the job start time. Accordingly, as in the examples described with reference to FIG. 4, the features of interest are job type, job submitter, and job start time.

Further, the second resource intensity possibility value indicates the likelihood of a computing job being classified as non-resource intensive within that time period, given the specific set of features in question. This possibility value can be represented as $$P^t_{na|j,c,s},$$

where na is "non-abusive" (referring to the job being non-resource intensive), and with the other symbols being the same as for the first resource intensity possibility value.

An approach to calculating $$P^t_{a|j,c,s} \text{ and } P^t_{na|j,c,s}$$

is set out below, according to some examples. For ease of reference, the term "abusive" is used below to refer to jobs that are classified as resource intensive. Firstly, to determine the percentage of abusive jobs in a given time period, the below formulas for $p_a$ (abusive job percentage) and $p_{na}$ (non-abusive job percentage, also referred to as "normal job percentage") may be used. The second set of formulas employ Laplace smoothing (e.g., to enable handling of segments with no jobs). In the formulas below, $N_a$ refers to the number of abusive jobs, and $N_{na}$ refers to the number of non-abusive or normal jobs.

$$p_a = \frac{N_a}{N_t}$$

$$p_{na} = \frac{N_{na}}{N_t}$$

$$p_a = \frac{N_a + 1}{N_t + N}$$

$$p_{na} = \frac{N_{na} + 1}{N_t + N}$$

Table 1 below illustrates the manner in which abusive job percentages may be calculated for different features. In the formulas of Table 1, $N_j$ refers to the number of abusive jobs that have the job type of the relevant unexecuted computing job, $N_c$ refers to the number of abusive jobs that have the company identifier of the relevant unexecuted computing job, and $N_s$ refers to the number of abusive jobs that have the start time of the given relevant unexecuted computing job. Further, $p_{j|a}$ is the probability of the job type j occurring in an abusive job condition, $P_{c|a}$ is the probability of the company identifier c occurring in an abusive job condition, and $P_{s|a}$ is the probability of the start time s occurring in an abusive job condition, where $N_a$ refers to the number of abusive jobs, and N is a smoothing factor (e.g., 1 or 2).

TABLE 1

Example formulas for calculating abusive job percentages and probabilities for different features

| Feature | Number of abusive jobs | Abusive job percentage | Abusive job percentage with smooth handling |
|---|---|---|---|
| Job type | $N_j$ | $p_{j\|a} = \frac{N_j}{N_a}$, | $p_{j\|a} = \frac{N_j + 1}{N_a + N}$ |
| Company identifier | $N_c$ | $p_{c\|a} = \frac{N_c}{N_a}$ | $p_{c\|a} = \frac{N_c + 1}{N_a + N}$ |
| Job start time | $N_s$ | $p_{s\|a} = \frac{N_s}{N_a}$ | $p_{s\|a} = \frac{N_s + 1}{N_a + N}$ |

Then, it is possible to determine a value indicating the likelihood of an abusive job for the specific time period and the given set of features (job type, company identifier, and job start time) as follows.

$$p^t_{a|j,c,s} = \frac{p_a * (p_{j|a} * p_{c|a} * p_{s|a})}{p_j * p_c * p_s},$$

where $$p_j = \frac{N_j}{N_t},\ p_c = \frac{N_c}{N_t},\ p_s = \frac{N_s}{N_t}.$$

In some examples, smoothing may be used to calculate $p_j$, $p_c$, and $p_s$, as described above. A similar approach can be followed to determine a value indicating the likelihood of a normal job, as follows $$p^t_{na|j,c,s} = \frac{p_{na} * (p_{j|na} * p_{c|na} * p_{s|na})}{p_j * p_c * p_s}$$

Given that the above formulas for $$p^t_{a|j,c,s} \text{ and } p^t_{na|j,c,s}$$

have the same denominator, only the numerators may be used to arrive at the final formulas for the resource intensity possibility values. Accordingly, the first and second resource intensity possibility values can be respectively determined as shown below:

$$p^t_{a|j,c,s} = p_a * (p_{j|a} * p_{c|a} * p_{s|a})$$

$$p^t_{na|j,c,s} = p_{na} * (p_{j|na} * p_{c|na} * p_{s|na})$$

In some examples, the prediction component 308 may check whether $$p^t_{a|j,c,s}$$

is greater than $$p^t_{na|j,c,s}$$

for the particular time period. If so, the prediction component 308 may determine that the unexecuted computing job can be classified as an abusive job within the historic time period t. However, as the unexecuted computing job will occur during a future time period, it is desirable to generate a prediction for the future time period.

The method 500 proceeds to operation 510, where the prediction component 308 generates a first aggregated resource intensity possibility value, and then to operation 512, where the prediction component 308 generates a second aggregated resource intensity possibility value. The aggregated resource intensity possibility values may be seen as providing predictions as to whether the unexecuted computing job will be resource intensive or non-resource intensive, as shown below.

Firstly, overall values covering all periods in the time series are calculated as shown below, where Nis the number of time periods and $w_t$ is a weight factor of between 0 and 1 applied to each time period. For example, if a particular time period in the time series is determined or suspected to have a significant impact on whether the unexecuted computing job will be abusive, that time period can be allocated a higher weight factor. For example, jobs occurring at certain times of day may tend to be more abusive (relative to other times of day) and the relevant time period may be allocated a higher weight factor. As another example, certain time periods may be associated with server maintenance or restarting, thus making it more likely that jobs occurring during those times could be abusive. The overall values may thus be seen as weighted average possibility values.

$$p_{a|j,c,s} = \sum_{t=1}^{N} \frac{p^t_{a|j,c,s} \times \omega_t}{N}$$

$$p_{na|j,c,s} = \sum_{t=1}^{N} \frac{p^t_{na|j,c,s} \times \omega_t}{N}$$

The overall values ($P_{a|j,c,s}$ and $P_{na|j,c,s}$) together with the possibility values for a latest period $$(p^t_{a|j,c,s} \text{ and } p^t_{na|j,c,s})$$

are then used to calculate $$p^{t+1}_{a|j,c,s} \text{ and } p^{t+1}_{na|j,c,s},$$

which represent the first and second aggregated resource intensity possibility values, respectively. A smoothing factor α is applied in both cases with respect to the possibility values for the latest period and the overall value.

$$p^{t+1}_{a|j,c,s} = \alpha P^t_{a|j,c,s} + (1-\alpha)P_{a|j,c,s},\ \alpha \in (0, 1)$$

$$p^{t+1}_{na|j,c,s} = \alpha P^t_{na|j,c,s} + (1-\alpha)P_{na|j,c,s},\ \alpha \in (0, 1)$$

$$p^{t+1}_{a|j,c,s}$$

indicates, for the future time period (t+1) in which the unexecuted computing job will be running, how likely the unexecuted computing job is to be resource intensive according to the set resource intensity criteria. Contrastingly, $$p^{t+1}_{na|j,c,s}$$

indicates, for the future time period (t+1), how likely the unexecuted computing job is to be non-resource intensive according to the set resource intensity criteria.

The method 500 proceeds to operation 514, where the first aggregated resource intensity possibility value $$(P^{t+1}_{a|j,c,s})$$

is compared to the second aggregated resource intensity possibility value $$(p^{t+1}_{na|j,c,s}).$$

If, at decision operation 516, the prediction component 308 detects that $$p^{t+1}_{a|j,c,s}$$

is greater than $$p^{t+1}_{na|j,c,s},$$

the job scheduling server 126 generates a resource intensity prediction indicating that the unexecuted computing job is likely to be resource intensive (operation 518). As mentioned, this resource intensity prediction may, in some cases, be generated before the unexecuted computing job has been received (e.g., generated in advance, prior to receiving a job request). In some examples, the job scheduling server 126 may flag an unexecuted computing job as having to be handled as a resource intensive job. Examples of such handling are described with reference to FIG. 6.

On the other hand, if, at decision operation 516, the prediction component 308 detects that $$p^{t+1}_{a|j,c,s}$$

is not greater than $$p^{t+1}_{na|j,c,s},$$

the job scheduling server 126 generates a resource intensity prediction indicating that the unexecuted computing job is not likely to be resource intensive (operation 522), in which case the unexecuted computing job may be scheduled in a conventional fashion. The method 500 concludes at closing loop element 520.

Accordingly, generation of a resource intensity prediction for an unexecuted computing job may include aggregating or combining the first resource intensity possibility values to obtain a first aggregated resource intensity possibility value, and checking whether the first aggregated resource intensity possibility value exceeds a threshold. The threshold may be defined by an aggregated or combined value from the second resource intensity possibility values, as explained above. Further, when aggregating or combining the resource intensity possibility values from different time periods in the historical job data, weighting or smoothing may be applied such that at least a subset of the time periods has a weight factor that is different than a weight factor applied with respect to another subset of the time periods.

The job scheduling server 126 may implement a rules engine to generate, for example, predictions or possibility values as described herein. The job scheduling server 126 may also implement a rules engine to identify and retrieve the historical data and feature data. Alternatively or additionally, one or more of these aspects may be implemented by utilizing machine learning techniques. As an example, a machine learning model may be trained using training data that includes historical data, such as past utilization data for jobs together with classifications of those jobs as resource intensive or non-resource intensive. In this way, the machine learning model may be trained to predict one or more values or scores as described herein. Example machine learning techniques are further described below, with reference to FIG. 7.

Figure 6:
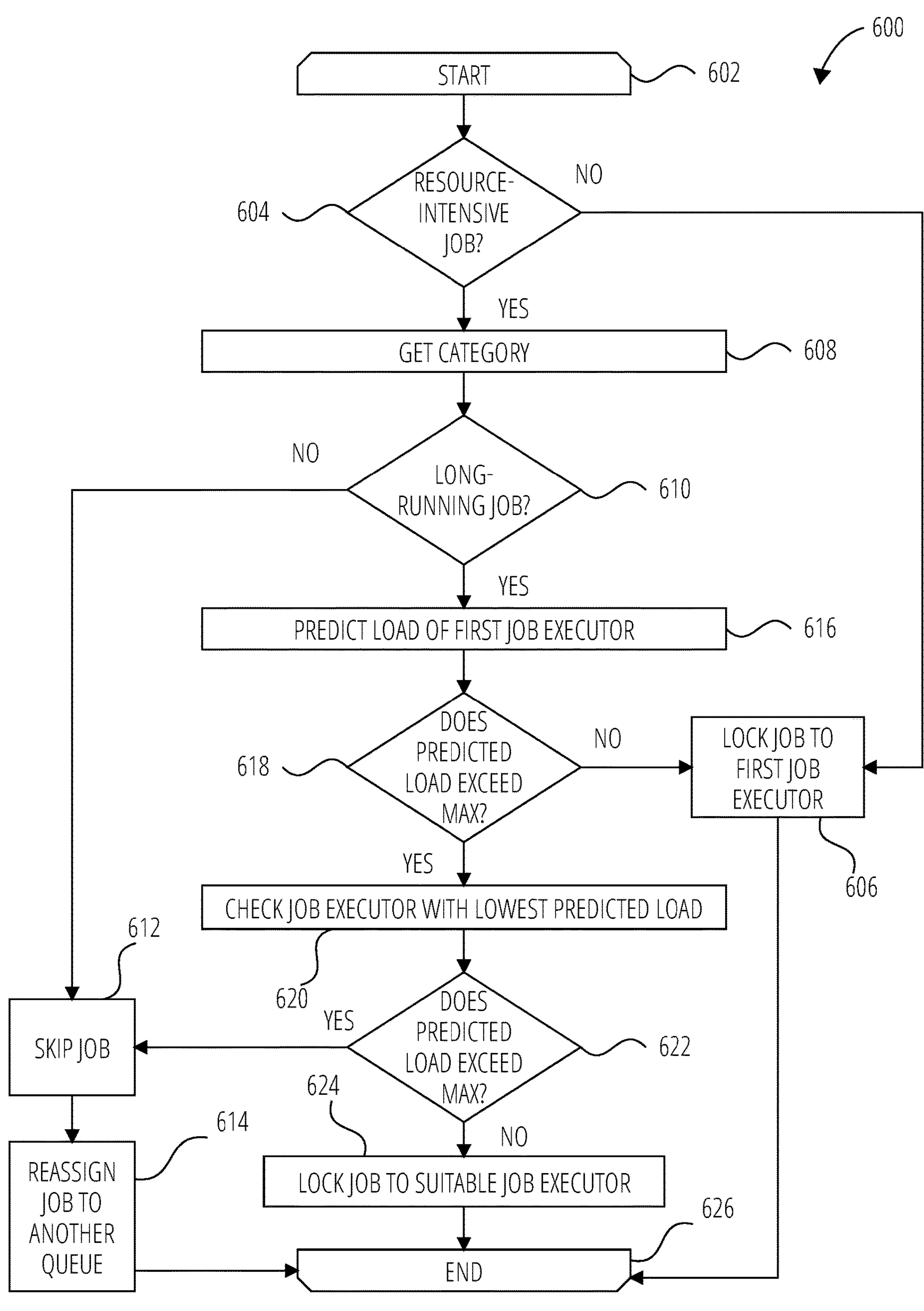
FIG. 6 is a flowchart illustrating operations of a method suitable for handling different categories of computing jobs that are predicted to be resource intensive, according to some examples.

FIG. 6 is a flowchart illustrating operations of a method 600 suitable for handling different categories of computing jobs that are predicted to be resource intensive, according to some examples. Aspects of the method 600 may be performed by components, devices, systems, networks, or databases shown in FIGS. 1-3. Accordingly, elements depicted in FIGS. 1-3 are referred to below by way of example and not limitation.

The method 600 commences at opening loop element 602 and proceeds to decision operation 604, where the job scheduling server 126 checks whether an unexecuted computing job is likely to be classified as resource intensive. For example, the techniques described with reference to FIG. 5 may be used to generate a resource intensity prediction.

As mentioned, a first job scheduler (e.g., a first available job scheduler according to a normal job assignment rule) may request the resource intensity prediction from the job scheduling server 126, or the job scheduling server 126 may generate the resource intensity prediction prior to any assignment. Where the job executor picks up an unexecuted computing job from the job scheduling server 126 and then requests the resource intensity prediction, it may call an API to the job scheduling server 126 such that the job scheduling server 126 can check whether $$p^{t+1}_{a|j,c,s}$$

is greater than $$p^{t+1}_{na|j,c,s}$$

for the particular incoming job. If so, the job executor detects that the unexecuted computing job is likely to be resource intensive. The unexecuted computing job may be flagged as such by the job scheduling server 126 or the relevant job executor.

If the unexecuted computing job is not predicted to be resource intensive (e.g., non-abusive or a "normal" job), the unexecuted computing job may simply be assigned to the first job executor, such as the next available job executor (operation 606). This may be the job executor that initially picked up the job and, where relevant, requested the job scheduling server 126 to predict the resource intensity of the job. On the other hand, if the unexecuted computing job is predicted to be resource intensive, the method 600 proceeds to operation 608, where a predicted resource intensity category of the unexecuted computing job is determined or obtained.

The job scheduling server 126 may generate or retrieve the predicted resource intensity category (e.g., from the prediction component 308). Alternatively, the job scheduling server 126 or a job executor in the distributed job execution system 128 may include a job classifier component that generates the predicted resource intensity category, or from which a previously generated predicted resource intensity category is retrieved.

Table 2 below illustrates the manner in which probability values may be determined for each possible resource intensity category. In the formulas of Table 2, $N_{long}$ is the number of abusive jobs in the long-running job category within a given subset of the historical job data (e.g., a subset that includes all historic jobs with the same features as the unexecuted computing job, such as the same job type, company identifier, and job start time), $N_{CPU}$ is the number of abusive jobs in the high processing resource utilization category (e.g., "high CPU category") in the given subset, $N_{memory}$ is the number of abusive jobs in the high memory resource utilization category (e.g., "high memory category") in the given subset, and $N_a$ is the total number of abusive jobs in the given subset. The category with the highest probability value may be selected as the predicted resource intensity category.

TABLE 2

Example formulas for calculating probability values of resource intensity categories

| Category | Number of abusive jobs | Probability value |
| --- | --- | --- |
| Long-running job category | $N_{long}$ | $p_l = \frac{N_{long}}{N_a}$ |
| High processing resource utilization category | $N_{cpu}$ | $p_c = \frac{N_{cpu}}{N_a}$ |
| High memory resource utilization category | $N_{memory}$ | $p_m = \frac{N_{memory}}{N_a}$ |

If the predicted resource intensity category is not "long-running" (e.g., if $p_l$ is less than both $p_c$ and $p_m$) at decision operation 610, a first job executor (e.g., the first available job executor, as mentioned above) may skip the unexecuted computing job (operation 612) and the job scheduling server 126 then reassigns the unexecuted computing job to another queue at operation 614. For example, for unexecuted computing jobs that are not "long-running" and are rather flagged as "high CPU" or "high memory," the assignment rule may be that the job scheduling server 126 reassigns the unexecuted computing job to a specific queue that has job executors with relatively high CPU or memory resources, as the case may be.

Accordingly, if the high resource utilization category predicted for the unexecuted computing job is a high processing resource utilization category, the job execution destination ultimately selected by the job scheduling server 126 may have greater processing resource availability than a first job execution destination (e.g., an initially available or designated job executor). Similarly, if the high resource utilization category is a high memory resource utilization category, the job execution destination ultimately selected by the job scheduling server 126 may have greater memory resource availability than the first job execution destination.

If it is determined at decision operation 610 that the unexecuted computing job is flagged as a "long-running job" (e.g., by the first job executor or by the job scheduling server 126) the method 600 proceeds to operation 616, where the load of the first job executor is predicted. As mentioned above, the unexecuted computing job is flagged as potentially resource intensive with respect to a future time period, and thus the load of the first job executor may be predicted for that same future time period.

In some examples, load calculations or predictions are made at a job executor (e.g., using the load checking component 218). The load checking component 218 (or, in other examples, the job scheduling server 126), may use the following approach to generate $F_{t+1}$, which is a load prediction for a future time period (t+1).

Firstly, a current or latest CPU utilization percentage ($C_t$) and a current or latest memory utilization percentage ($M_t$) can be calculated as follows (by dividing a current or latest CPU usage by total available CPU resources, and dividing a current or latest memory usage by total available memory sources):

$$C_t = \frac{C_{current}}{C_{total}}$$

$$M_t = \frac{M_{current}}{M_{total}}$$

Then, a current or latest job executor load $F_t$ can be calculated using the formula below, where w represents a weight for CPU utilization and (l−w) represents a weight for memory utilization. These weights may be predefined globally or granularly, such as per category or per resource type. A maximum load $F_{Max}$ of the job executor may be calculated in a similar manner, as is also shown below. $F_{Max}$ may be a maximum load for low-running jobs or a general maximum load for the particular job executor. $C_{Max}$ and $M_{Max}$ refer, respectively, to the maximum supported CPU and memory associated with the job executor.

$$F_t = \omega C_t + (1 - \omega) M_t$$

$$F_{Max} = \omega C_{Max} + (1 - \omega) M_{Max}$$

The method 600 may include determining an average load $F_N$ of the job executor over the previous N job executions, as shown below, where $C_i$ represents the CPU utilization percentage for each execution, and $M_i$ represents the memory utilization percentage for each execution, with the same weight w as above being applied.

$$C_i = \frac{C_{id}}{C_{total}}$$

$$M_i = \frac{M_{id}}{M_{total}}$$

$$F_N = \sum_{t=1}^{N} \frac{\omega C_i + (1 - \omega) M_i}{N}$$

It is then possible to determine the load prediction $F_{t+1}$ as follows, where $w_t$ is a weight applied to the current or latest load and $w_N$ is a weight applied to the average load, and $w_t + w_N$ equals 1.

$$F_{t+1} = \omega_t F_t + \omega_N F_N$$

The predicted load $F_{t+1}$ is compared to the maximum load $F_{Max}$ at decision operation 618. If $F_{t+1}$ is not greater than $F_{Max}$, the first job executor (e.g., the job executor that sent the initial request to the job scheduling server 126) will pick up the unexecuted computing job (see operation 606). If it is greater than $F_{Max}$, the job executor may report to the job scheduling server 126 that it will not handle the job, allowing the job scheduling server 126 to check for another job executor. For example, the job scheduling server 126 may, at operation 620, check which job executor linked to the same queue has the lowest predicted load $F_{t+1}$.

If the $F_{t+1}$ value for the job executor being checked is less than the relevant $F_{Max}$ (decision operation 622), the unexecuted computing job is locked to that job executor at operation 624. If not, the unexecuted computing job may be skipped (see operation 612) and then reassigned to another queue (see operation 614) by the job scheduling server 126.

The unexecuted computing job may thus be skipped and reassigned to another queue if no job executor linked to the queue can support the unexecuted computing job. The method 600 concludes at closing loop element 626.

Accordingly, where the predicted resource intensity category is a long-running job category, utilization data checked by the job executor or job scheduling server 126 may include processing resource utilization and memory resource utilization of at least a first job execution destination and a second job execution destination. If a predicted load associated with the first job execution destination exceeds a maximum load, but a predicted load associated with the second job execution destination does not exceed a maximum load, the second job execution destination is selected as the selected job execution destination. Further, the job scheduling server 126 may first consider job executors in the same queue to attempt to assign the long-running job. If this attempt fails, the job scheduling server 126 may assign the long-running job to another queue.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: generating, based on historical job data and a plurality of features of an unexecuted computing job, a resource intensity prediction indicating that the unexecuted computing job is predicted to be classified as resource intensive, the historical job data classifying each of a plurality of executed computing jobs as either resource intensive or non-resource intensive; determining a predicted resource intensity category of the unexecuted computing job, the predicted resource intensity category being selected from a plurality of resource intensity categories; accessing utilization data associated with one or more of a plurality of cloud-based job execution destinations; and assigning, based on the predicted resource intensity category and the utilization data, the unexecuted computing job to a selected job execution destination from among the plurality of cloud-based job execution destinations.

In Example 2, the subject matter of Example 1 includes, wherein the assigning of the unexecuted computing job to the selected job execution destination comprises: identifying an assignment rule corresponding to the predicted resource intensity category, wherein at least some of the resource intensity categories have different assignment rules; and applying the assignment rule corresponding to the predicted resource intensity category to select the selected job execution destination from among the plurality of cloud-based job execution destinations.

In Example 3, the subject matter of Example 2 includes, wherein the predicted resource intensity category is a long-running job category, the utilization data comprises processing resource utilization and memory resource utilization of a first job execution destination and a second job execution destination of the plurality of cloud-based job execution destinations, and the applying of the assignment rule comprises: determining, based on the utilization data, that a predicted load associated with the first job execution destination exceeds a maximum load of the first job execution destination; determining, based on the utilization data, that the predicted load associated with the second job execution destination is less than a maximum load of the second job execution destination; and in response to determining that the predicted load of the second job execution destination is less than the maximum load of the second job execution destination, designating the second job execution destination as the selected job execution destination.

In Example 4, the subject matter of any of Examples 2-3 includes, wherein the predicted resource intensity category is a high resource utilization category, and the applying of the assignment rule comprises: reassigning the unexecuted computing job from a first job execution destination to the selected job execution destination.

In Example 5, the subject matter of Example 4 includes, wherein the high resource utilization category is a high processing resource utilization category, the selected job execution destination having greater processing resource availability than the first job execution destination.

In Example 6, the subject matter of any of Examples 4-5 includes, wherein the high resource utilization category is a high memory resource utilization category, the selected job execution destination having greater memory resource availability than the first job execution destination.

In Example 7, the subject matter of any of Examples 1-6 includes, wherein the resource intensity prediction indicates that the unexecuted computing job is predicted to be classified as resource intensive in a discrete future time period, and the generating of the resource intensity prediction comprises: segmenting the historical job data into a sequence of discrete time periods preceding the future time period; for each time period in the sequence, generating, based on the executed computing jobs that occurred during the time period, a resource intensity possibility value indicating a likelihood that a given computing job with the plurality of features would have been classified as resource intensive in the time period; and using the resource intensity possibility values for the sequence of time periods to generate the resource intensity prediction for the future time period.

In Example 8, the subject matter of Example 7 includes, wherein the generating of the resource intensity prediction further comprises: aggregating the resource intensity possibility values to obtain an aggregated resource intensity possibility value; detecting that the aggregated resource intensity possibility value exceeds a threshold; and in response to detecting that the aggregated resource intensity possibility value exceeds the threshold, generating the resource intensity prediction for the future time period.

In Example 9, the subject matter of Example 8 includes, wherein the aggregating of the resource intensity possibility values comprises performing exponential smoothing to apply, with respect to at least a subset of the time periods, a weight factor that is different than a weight factor applied with respect to another subset of the time periods.

In Example 10, the subject matter of any of Examples 8-9 includes, wherein each resource intensity possibility value is a first resource intensity possibility value for the respective time period, the aggregated resource intensity possibility value is a first aggregated resource intensity possibility value, and the generating of the resource intensity prediction further comprises: for each time period in the sequence, generating, based on the executed computing jobs that occurred during the time period, a second resource intensity possibility value indicating a likelihood that a given computing job with the plurality of features would have been classified as non-resource intensive in the time period; and aggregating the second resource intensity possibility values to obtain a second aggregated resource intensity possibility value, wherein the second aggregated resource intensity possibility value is applied as the threshold.

In Example 11, the subject matter of any of Examples 1-10 includes, wherein the determining of the predicted resource intensity category comprises: generating, based on the historical job data, a probability value for each resource intensity category, each of the probability values being indicative of a probability that the unexecuted computing job will be categorized in the respective resource intensity category.

In Example 12, the subject matter of any of Examples 1-11 includes, wherein the plurality of features of the unexecuted computing job comprises at least one of: job submitter, job type, job submission time, or job start time.

In Example 13, the subject matter of any of Examples 1-12 includes, wherein a computing job is classified as resource intensive if the computing job meets one or more resource intensity criteria comprising at least one of: duration of the computing job exceeds a time threshold, load associated with the computing job exceeds a maximum load, memory resources consumed by the computing job exceed a memory resource threshold, or processing resources consumed by the computing job exceed a processing resource threshold.

In Example 14, the subject matter of any of Examples 1-13 includes, wherein the job execution destinations comprise at least one of: a job executor, a queue linked to a job executor, or a queue linked to a plurality of job executors.

Example 15 is a method comprising: generating, based on historical job data and a plurality of features of an unexecuted computing job, a resource intensity prediction indicating that the unexecuted computing job is predicted to be classified as resource intensive, the historical job data classifying each of a plurality of executed computing jobs as either resource intensive or non-resource intensive; determining a predicted resource intensity category of the unexecuted computing job, the predicted resource intensity category being selected from a plurality of resource intensity categories; accessing utilization data associated with one or more of a plurality of cloud-based job execution destinations; and assigning, based on the predicted resource intensity category and the utilization data, the unexecuted computing job to a selected job execution destination from among the plurality of cloud-based job execution destinations.

In Example 16, the subject matter of Example 15 includes, wherein the assigning of the unexecuted computing job to the selected job execution destination comprises: identifying an assignment rule corresponding to the predicted resource intensity category, wherein at least some of the resource intensity categories have different assignment rules; and applying the assignment rule corresponding to the predicted resource intensity category to select the selected job execution destination from among the plurality of cloud-based job execution destinations.

In Example 17, the subject matter of any of Examples 15-16 includes, wherein the resource intensity prediction indicates that the unexecuted computing job is predicted to be classified as resource intensive in a discrete future time period, and the generating of the resource intensity prediction comprises: segmenting the historical job data into a sequence of discrete time periods preceding the future time period; for each time period in the sequence, generating, based on the executed computing jobs that occurred during the time period, a resource intensity possibility value indicating a likelihood that a given computing job with the plurality of features would have been classified as resource intensive in the time period; and using the resource intensity possibility values for the sequence of time periods to generate the resource intensity prediction for the future time period.

Example 18 is a non-transitory computer-readable medium that stores instructions that, when executed by one or more processors, cause the one or more processors to perform operations comprising: generating, based on historical job data and a plurality of features of an unexecuted computing job, a resource intensity prediction indicating that the unexecuted computing job is predicted to be classified as resource intensive, the historical job data classifying each of a plurality of executed computing jobs as either resource intensive or non-resource intensive; determining a predicted resource intensity category of the unexecuted computing job, the predicted resource intensity category being selected from a plurality of resource intensity categories; accessing utilization data associated with one or more of a plurality of cloud-based job execution destinations; and assigning, based on the predicted resource intensity category and the utilization data, the unexecuted computing job to a selected job execution destination from among the plurality of cloud-based job execution destinations.

In Example 19, the subject matter of Example 18 includes, wherein the assigning of the unexecuted computing job to the selected job execution destination comprises: identifying an assignment rule corresponding to the predicted resource intensity category, wherein at least some of the resource intensity categories have different assignment rules; and applying the assignment rule corresponding to the predicted resource intensity category to select the selected job execution destination from among the plurality of cloud-based job execution destinations.

In Example 20, the subject matter of any of Examples 18-19 includes, wherein the resource intensity prediction indicates that the unexecuted computing job is predicted to be classified as resource intensive in a discrete future time period, and the generating of the resource intensity prediction comprises: segmenting the historical job data into a sequence of discrete time periods preceding the future time period; for each time period in the sequence, generating, based on the executed computing jobs that occurred during the time period, a resource intensity possibility value indicating a likelihood that a given computing job with the plurality of features would have been classified as resource intensive in the time period; and using the resource intensity possibility values for the sequence of time periods to generate the resource intensity prediction for the future time period.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 7:
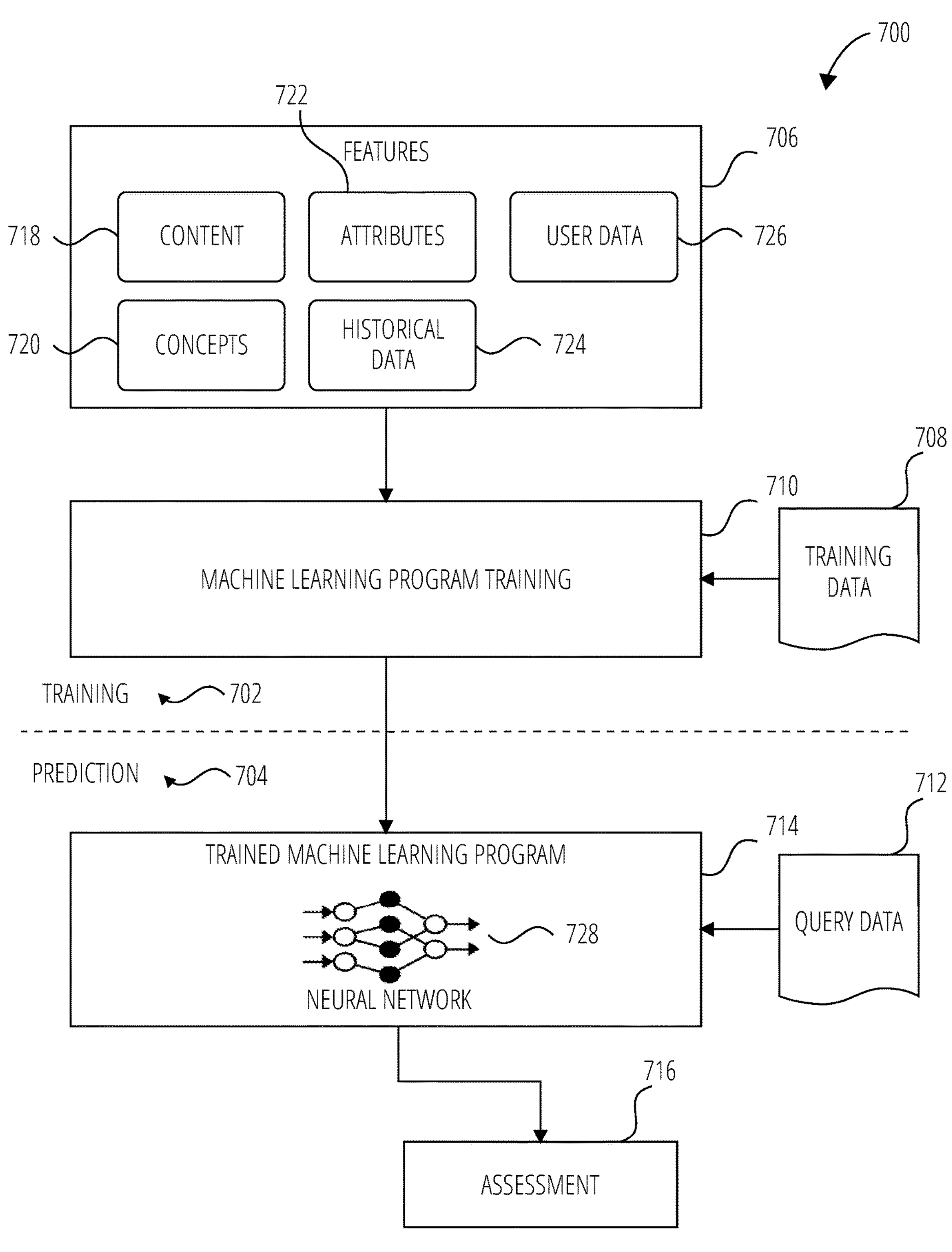
FIG. 7 diagrammatically illustrates training and use of a machine learning program, according to some examples.

FIG. 7 is a block diagram showing a machine learning program 700, according to some examples. Machine learning programs, also referred to as machine learning algorithms or tools, may be used as part of the systems described herein to perform one or more operations, such as to predict whether a computing job will be resource intensive, to predict a category of a computing job, or to assign a computing job to a job execution destination.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 708 in order to make data-driven predictions or decisions expressed as outputs or assessments (e.g., assessment 716). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 700 supports two types of phases, namely training phases 702 and prediction phases 704. In training phases 702, supervised learning, unsupervised or reinforcement learning may be used. For example, the machine learning program 700 (1) receives features 706 (e.g., as structured or labeled data in supervised learning) and/or (2) identifies features 706 (e.g., unstructured or unlabeled data for unsupervised learning) in training data 708. In prediction phases 704, the machine learning program 700 uses the features 706 for analyzing query data 712 to generate outcomes or predictions, as examples of an assessment 716.

In the training phase 702, feature engineering is used to identify features 706 and may include identifying informative, discriminating, and independent features for the effective operation of the machine learning program 700 in pattern recognition, classification, and regression. In some examples, the training data 708 includes labeled data, which is known data for pre-identified features 706 and one or more outcomes. Each of the features 706 may be a variable or attribute, such as individual measurable property of a process, article, system, or phenomenon represented by a data set (e.g., the training data 708). Features 706 may also be of different types, such as numeric features, strings, and graphs, and may include one or more of content 718, concepts 720, attributes 722, historical data 724 and/or user data 726, merely for example.

The concept of a feature in this context is related to that of an explanatory variable used in statistical techniques such as linear regression. Choosing informative, discriminating, and independent features is important for the effective operation of the machine learning program 700 in pattern recognition, classification, and regression. Features may be of different types, such as numeric features, strings, and graphs.

In training phases 702, the machine learning program 700 uses the training data 708 to find correlations among the features 706 that affect a predicted outcome or assessment 716. With the training data 708 and the identified features 706, the machine learning program 700 is trained during the training phase 702 at machine learning program training 710. The machine learning program 700 appraises values of the features 706 as they correlate to the training data 708. The result of the training is the trained machine learning program 714 (e.g., a trained or learned model).

Further, the training phases 702 may involve machine learning, in which the training data 708 is structured (e.g., labeled during preprocessing operations), and the trained machine learning program 714 implements a relatively simple neural network 728 capable of performing, for example, classification and clustering operations. In other examples, the training phase 702 may involve deep learning, in which the training data 708 is unstructured, and the trained machine learning program 714 implements a deep neural network 728 that is able to perform both feature extraction and classification/clustering operations.

A neural network 728 generated during the training phase 702, and implemented within the trained machine learning program 714, may include a hierarchical (e.g., layered) organization of neurons. For example, neurons (or nodes) may be arranged hierarchically into a number of layers, including an input layer, an output layer, and multiple hidden layers. Each of the layers within the neural network 728 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 728 may also be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a Convolutional Neural Network (CNN), or a Recursive Neural Network (RNN), merely for example.

During prediction phases 704, the trained machine learning program 714 is used to perform an assessment. Query data 712 is provided as an input to the trained machine learning program 714, and the trained machine learning program 714 generates the assessment 716 as output, responsive to receipt of the query data 712.

Figure 8:
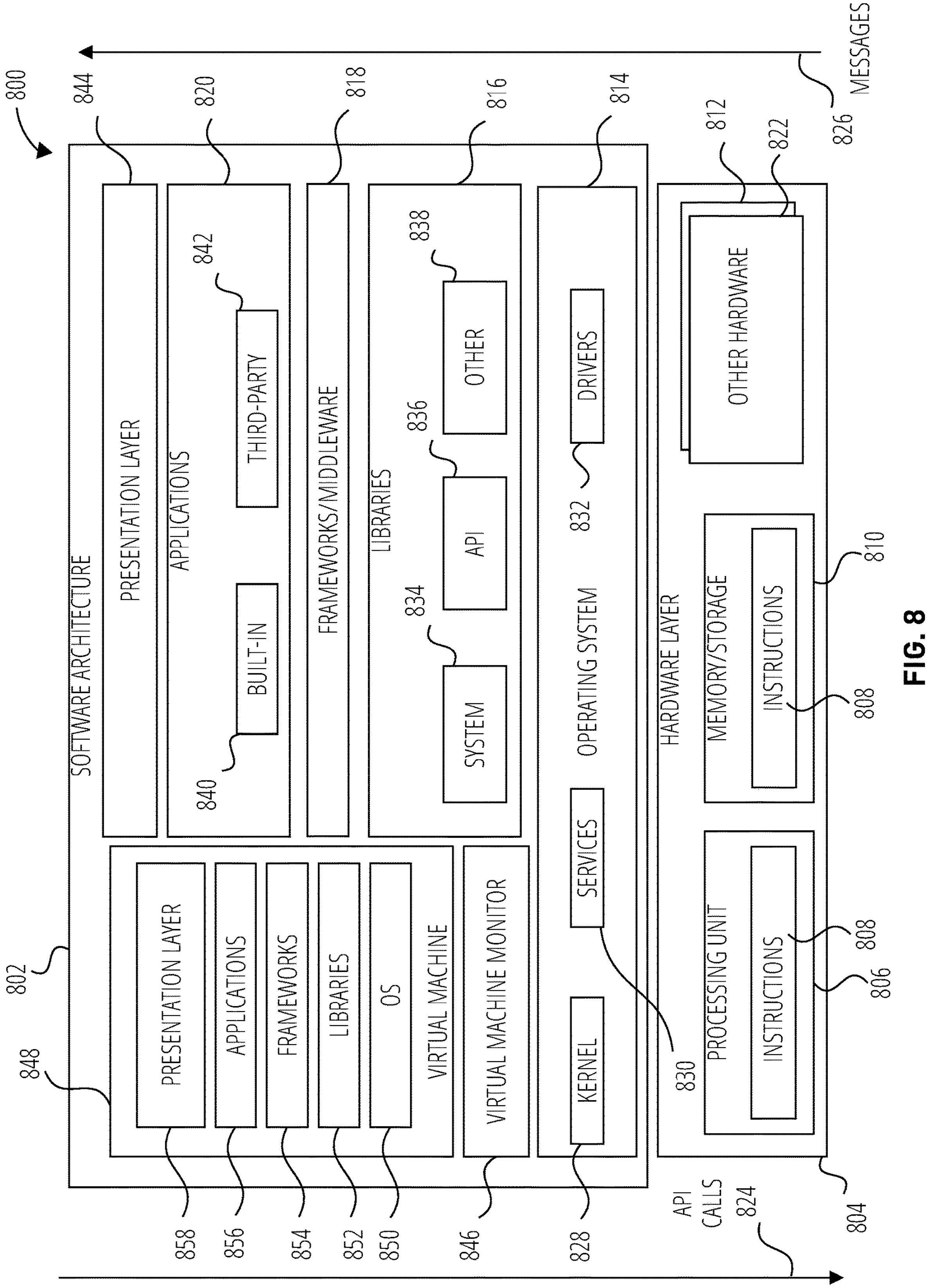
FIG. 8 is a block diagram showing a software architecture for a computing device, according to some examples.

FIG. 8 is a block diagram 800 showing a software architecture 802 for a computing device, according to some examples. The software architecture 802 may be used in conjunction with various hardware architectures, for example, as described herein. FIG. 8 is merely a non-limiting illustration of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 and other hardware 822 which represent any other hardware of the hardware layer 804, such as the other hardware illustrated as part of the software architecture 802.

In the architecture of FIG. 8, the software architecture 802 may be conceptualized as a stack of layers where each layer provides particular functionality. For example, the software architecture 802 may include layers such as an operating system 814, libraries 816, frameworks/middleware layer 818, applications 820, and presentation layer 844. Operationally, the applications 820 or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 or other components or layers. The libraries 816 typically provide functionality that allows other software modules to perform tasks in an easier fashion than to interface directly with the underlying operating system 814 functionality (e.g., kernel 828, services 830 or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware layer 818 may provide a higher-level common infrastructure that may be utilized by the applications 820 or other software components/modules. For example, the frameworks/middleware layer 818 may provide various graphic user interface functions, high-level resource management, high-level location services, and so forth. The frameworks/middleware layer 818 may provide a broad spectrum of other APIs that may be utilized by the applications 820 or other software components/modules, some of which may be specific to a particular operating system or platform.

The applications 820 include built-in applications 840 or third-party applications 842. Examples of representative built-in applications 840 may include, but are not limited to, a contacts application, a browser application, a book reader application, a location application, a media application, a messaging application, or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 or drivers 832), libraries (e.g., system libraries 834, API libraries 836, and other libraries 838), and frameworks/middleware layer 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (e.g., operating system 814). A software architecture executes within the virtual machine 848 such as an operating system 850, libraries 852, frameworks/middleware 854, applications 856 or presentation layer 858. These layers of software architecture executing within the virtual machine 848 can be the same as corresponding layers previously described or may be different.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, such as a computer program tangibly embodied in an information carrier (e.g., in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, such as an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 9:
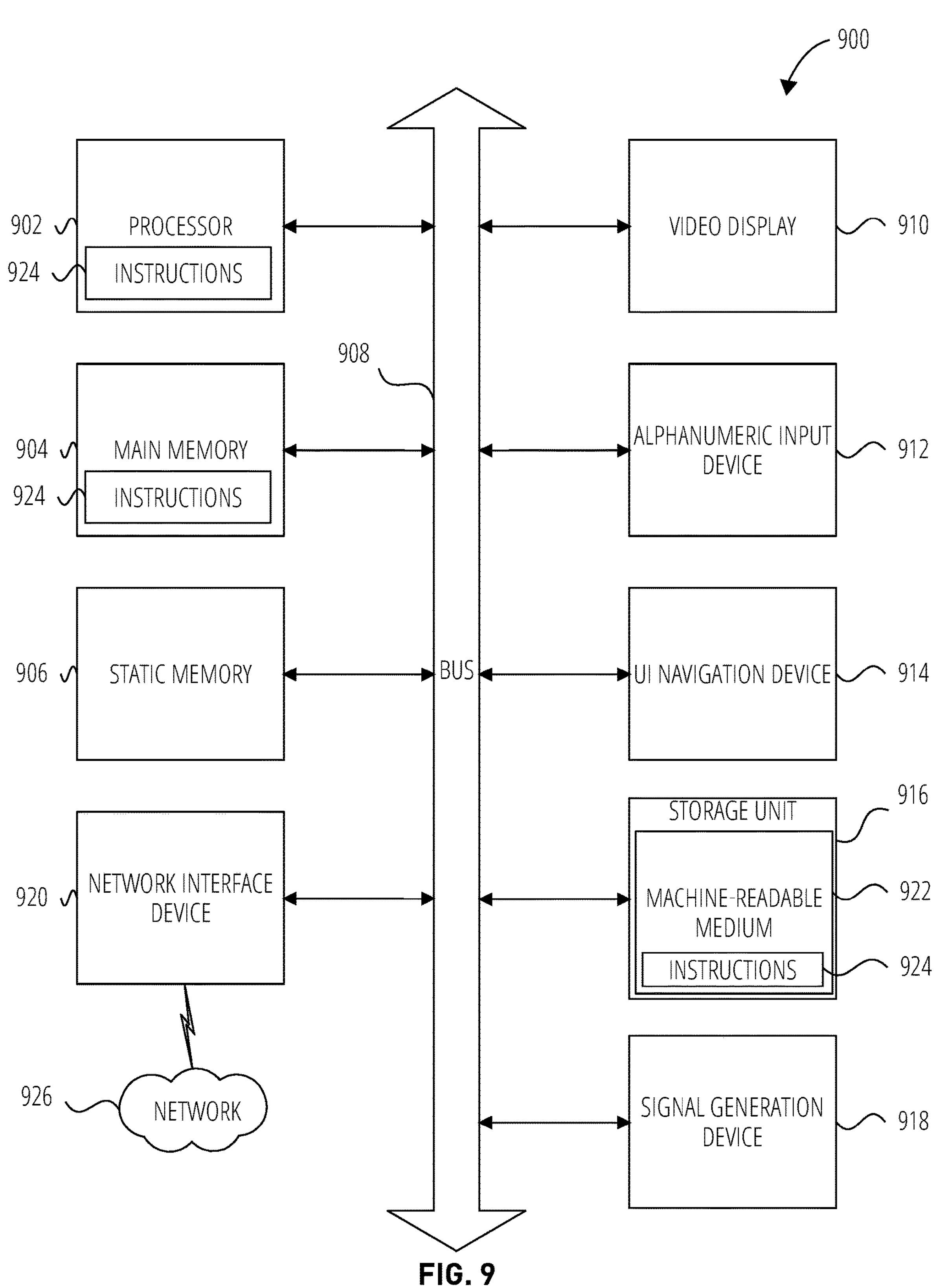
FIG. 9 is a block diagram of a machine in the form of a computer system, according to some examples, within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a GPU, or both), a primary or main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a storage unit 916, a signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 or within the processor 902 during execution thereof by the computer system 900, with the main memory 904 and the processor 902 also each constituting a machine-readable medium 922.

While the machine-readable medium 922 is shown in accordance with some examples to be a single medium, the term "machine-readable medium" may include a single medium or multiple media (e.g., a centralized or distributed database, or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of a machine-readable medium 922 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense (e.g., in the sense of "including, but not limited to"). As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

What is claimed is:

1. A system comprising:

at least one memory that stores instructions; and one or more processors configured by the instructions to perform operations comprising:

generating, based on historical job data and a plurality of features of an unexecuted computing job, a resource intensity prediction indicating that the unexecuted computing job is predicted to be classified as resource intensive, the historical job data classifying each of a plurality of executed computing jobs as either resource intensive or non-resource intensive;

determining a predicted resource intensity category of the unexecuted computing job, the predicted resource intensity category being selected from a plurality of resource intensity categories;

accessing utilization data associated with one or more of a plurality of cloud-based job execution destinations; and assigning, based on the predicted resource intensity category and the utilization data, the unexecuted computing job to a selected job execution destination from among the plurality of cloud-based job execution destinations, wherein the assigning of the unexecuted computing job to the selected job execution destination comprises:

identifying an assignment rule corresponding to the predicted resource intensity category, wherein at least some of the resource intensity categories have different assignment rules; and applying the assignment rule corresponding to the predicted resource intensity category to select the selected job execution destination from among the plurality of cloud-based job execution destinations.

2. The system of claim 1, wherein the predicted resource intensity category is a long-running job category, the utilization data comprises processing resource utilization and memory resource utilization of a first job execution destination and a second job execution destination of the plurality of cloud-based job execution destinations, and the applying of the assignment rule comprises:

determining, based on the utilization data, that a predicted load associated with the first job execution destination exceeds a maximum load of the first job execution destination;

determining, based on the utilization data, that the predicted load associated with the second job execution destination is less than a maximum load of the second job execution destination; and in response to determining that the predicted load of the second job execution destination is less than the maximum load of the second job execution destination, designating the second job execution destination as the selected job execution destination.

3. The system of claim 1, wherein the predicted resource intensity category is a high resource utilization category, and the applying of the assignment rule comprises:

reassigning the unexecuted computing job from a first job execution destination to the selected job execution destination.

4. The system of claim 3, wherein the high resource utilization category is a high processing resource utilization category, the selected job execution destination having greater processing resource availability than the first job execution destination.

5. The system of claim 3, wherein the high resource utilization category is a high memory resource utilization category, the selected job execution destination having greater memory resource availability than the first job execution destination.

6. The system of claim 1, wherein the resource intensity prediction indicates that the unexecuted computing job is predicted to be classified as resource intensive in a discrete future time period, and the generating of the resource intensity prediction comprises:

segmenting the historical job data into a sequence of discrete time periods preceding the future time period;

for each time period in the sequence, generating, based on the executed computing jobs that occurred during the time period, a resource intensity possibility value indicating a likelihood that a given computing job with the plurality of features would have been classified as resource intensive in the time period; and using the resource intensity possibility values for the sequence of time periods to generate the resource intensity prediction for the future time period.

7. The system of claim 6, wherein the generating of the resource intensity prediction further comprises:

aggregating the resource intensity possibility values to obtain an aggregated resource intensity possibility value;

detecting that the aggregated resource intensity possibility value exceeds a threshold; and in response to detecting that the aggregated resource intensity possibility value exceeds the threshold, generating the resource intensity prediction for the future time period.

8. The system of claim 7, wherein the aggregating of the resource intensity possibility values comprises performing exponential smoothing to apply, with respect to at least a subset of the time periods, a weight factor that is different than a weight factor applied with respect to another subset of the time periods.

9. The system of claim 7, wherein each resource intensity possibility value is a first resource intensity possibility value for the respective time period, the aggregated resource intensity possibility value is a first aggregated resource intensity possibility value, and the generating of the resource intensity prediction further comprises:

for each time period in the sequence, generating, based on the executed computing jobs that occurred during the time period, a second resource intensity possibility value indicating a likelihood that a given computing job with the plurality of features would have been classified as non-resource intensive in the time period; and aggregating the second resource intensity possibility values to obtain a second aggregated resource intensity possibility value, wherein the second aggregated resource intensity possibility value is applied as the threshold.

10. The system of claim 1, wherein the determining of the predicted resource intensity category comprises:

generating, based on the historical job data, a probability value for each resource intensity category, each of the probability values being indicative of a probability that the unexecuted computing job will be categorized in the respective resource intensity category.

11. The system of claim 1, wherein the plurality of features of the unexecuted computing job comprises at least one of: job submitter, job type, job submission time, or job start time.

12. The system of claim 1, wherein a computing job is classified as resource intensive if the computing job meets one or more resource intensity criteria comprising at least one of: duration of the computing job exceeds a time threshold, load associated with the computing job exceeds a maximum load, memory resources consumed by the computing job exceed a memory resource threshold, or processing resources consumed by the computing job exceed a processing resource threshold.

13. The system of claim 1, wherein the job execution destinations comprise at least one of: a job executor, a queue linked to a job executor, or a queue linked to a plurality of job executors.

14. A method comprising:

generating, based on historical job data and a plurality of features of an unexecuted computing job, a resource intensity prediction indicating that the unexecuted computing job is predicted to be classified as resource intensive, the historical job data classifying each of a plurality of executed computing jobs as either resource intensive or non-resource intensive;

determining a predicted resource intensity category of the unexecuted computing job, the predicted resource intensity category being selected from a plurality of resource intensity categories;

accessing utilization data associated with one or more of a plurality of cloud-based job execution destinations; and assigning, based on the predicted resource intensity category and the utilization data, the unexecuted computing job to a selected job execution destination from among the plurality of cloud-based job execution destinations, wherein the assigning of the unexecuted computing job to the selected job execution destination comprises:

identifying an assignment rule corresponding to the predicted resource intensity category, wherein at least some of the resource intensity categories have different assignment rules; and applying the assignment rule corresponding to the predicted resource intensity category to select the selected job execution destination from among the plurality of cloud-based job execution destinations.

15. The method of claim 14, wherein the resource intensity prediction indicates that the unexecuted computing job is predicted to be classified as resource intensive in a discrete future time period, and the generating of the resource intensity prediction comprises:

segmenting the historical job data into a sequence of discrete time periods preceding the future time period;

for each time period in the sequence, generating, based on the executed computing jobs that occurred during the time period, a resource intensity possibility value indicating a likelihood that a given computing job with the plurality of features would have been classified as resource intensive in the time period; and using the resource intensity possibility values for the sequence of time periods to generate the resource intensity prediction for the future time period.

16. A non-transitory computer-readable medium that stores instructions that, when executed by one or more processors, cause the one or more processors to perform operations comprising:

generating, based on historical job data and a plurality of features of an unexecuted computing job, a resource intensity prediction indicating that the unexecuted computing job is predicted to be classified as resource intensive, the historical job data classifying each of a plurality of executed computing jobs as either resource intensive or non-resource intensive;

determining a predicted resource intensity category of the unexecuted computing job, the predicted resource intensity category being selected from a plurality of resource intensity categories;

accessing utilization data associated with one or more of a plurality of cloud-based job execution destinations; and assigning, based on the predicted resource intensity category and the utilization data, the unexecuted computing job to a selected job execution destination from among the plurality of cloud-based job execution destinations, wherein the assigning of the unexecuted computing job to the selected job execution destination comprises:

identifying an assignment rule corresponding to the predicted resource intensity category, wherein at least some of the resource intensity categories have different assignment rules; and applying the assignment rule corresponding to the predicted resource intensity category to select the selected job execution destination from among the plurality of cloud-based job execution destinations.

17. The non-transitory computer-readable medium of claim 16, wherein the resource intensity prediction indicates that the unexecuted computing job is predicted to be classified as resource intensive in a discrete future time period, and the generating of the resource intensity prediction comprises:

segmenting the historical job data into a sequence of discrete time periods preceding the future time period;

for each time period in the sequence, generating, based on the executed computing jobs that occurred during the time period, a resource intensity possibility value indicating a likelihood that a given computing job with the plurality of features would have been classified as resource intensive in the time period; and using the resource intensity possibility values for the sequence of time periods to generate the resource intensity prediction for the future time period.

* * * * *